(12) United States Patent
Nestleroad et al.

(10) Patent No.: US 9,981,367 B2
(45) Date of Patent: May 29, 2018

(54) EXTERIOR INDEXING PROCESS AND TOOLING

(71) Applicant: THE BOEING COMPANY, Chicago, IL (US)

(72) Inventors: Mark Edward Nestleroad, Charleston, SC (US); Andrew Michael Huckey, Charleston, SC (US); William Shawn Whorton, Charleston, SC (US); Craig Charlton, Charleston, SC (US); Jake Aspen Wilson, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 399 days.

(21) Appl. No.: 14/793,403

(22) Filed: Jul. 7, 2015

(65) Prior Publication Data

US 2017/0008646 A1     Jan. 12, 2017

(51) Int. Cl.
| | | |
|---|---|---|
| B23P 19/10 | (2006.01) | |
| B25B 27/16 | (2006.01) | |
| B23K 37/053 | (2006.01) | |
| B23Q 3/18 | (2006.01) | |
| B64F 5/10 | (2017.01) | |
| F16L 1/10 | (2006.01) | |

(52) U.S. Cl.
CPC ............ *B25B 27/16* (2013.01); *B23K 37/053* (2013.01); *B23K 37/0533* (2013.01); *B23P 19/10* (2013.01); *B23Q 3/186* (2013.01); *B64F 5/10* (2017.01); *B23P 2700/01* (2013.01); *F16L 1/10* (2013.01)

(58) Field of Classification Search
CPC .......... B25B 27/16; B23P 19/10; B23P 19/04; B23P 11/00; B23K 37/0533; Y10T 29/53835; Y10T 29/53978

USPC .................................................... 29/271, 272
See application file for complete search history.

(56) References Cited

U.S. PATENT DOCUMENTS

| | | | |
|---|---|---|---|
| 8,061,035 B2 | 11/2011 | Stulc et al. | |
| 2012/0132750 A1* | 5/2012 | Gorr | B64C 1/061 244/120 |
| 2014/0338165 A1* | 11/2014 | Edwards | B23P 19/10 29/252 |

FOREIGN PATENT DOCUMENTS

EP     2738085 A1     6/2014

OTHER PUBLICATIONS

European Search Report for 16177810.5, dated Nov. 29, 2016.

* cited by examiner

*Primary Examiner* — Jason L Vaughan
*Assistant Examiner* — Amanda Meneghini
(74) *Attorney, Agent, or Firm* — Patterson + Sheridan, LLP

(57) ABSTRACT

Method and apparatus for aligning fastener holes of two components. An alignment fixture includes two mating fixtures. Each mating fixture includes a reference plate that is aligned to the fastener holes of one of the components. Each mating fixture also includes an alignment device. The alignment devices can be aligned with the respective reference plates such that the alignment between the reference plates and the fastener holes are transferred to the alignment devices. Once aligned, the alignment devices can be temporarily attached to the respective components at locations away from the fastener holes. The reference plates can then be removed. Thereafter, the components can be brought together such that mating features on the alignment devices engage. Engagement of the mating features aligns the two components such that the fastener holes on the components are aligned.

19 Claims, 16 Drawing Sheets

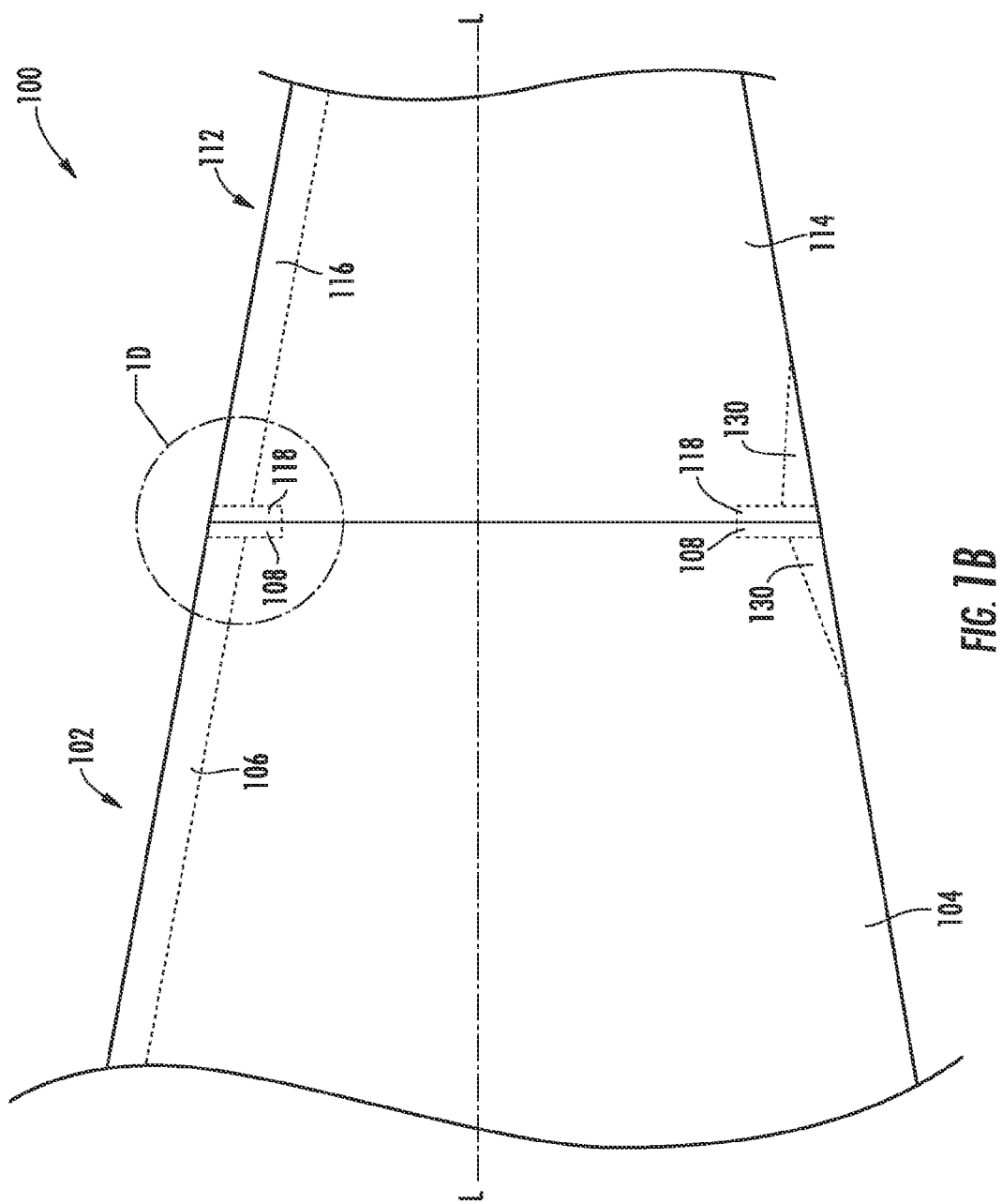

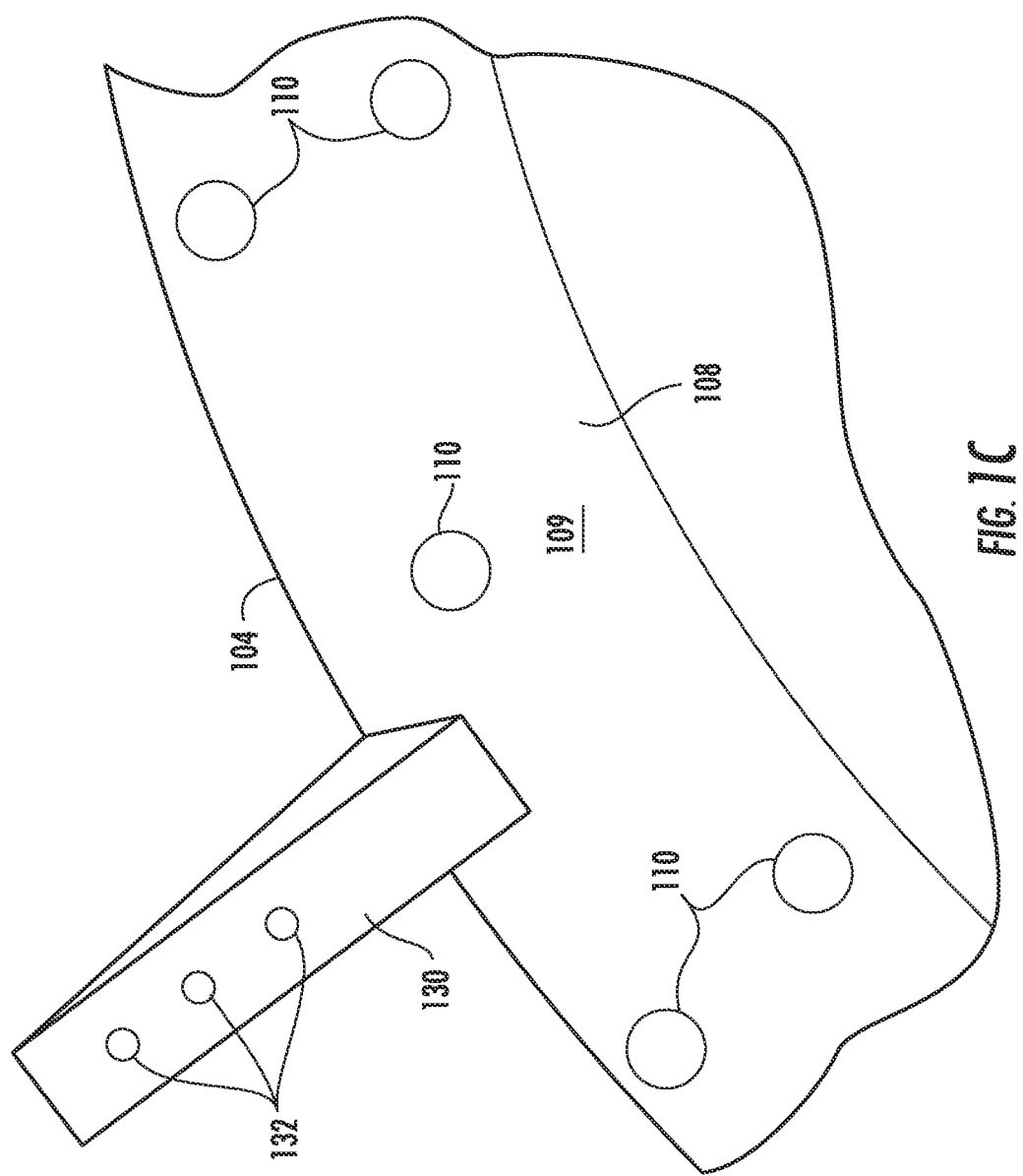

EXTERIOR INDEXING PROCESS AND TOOLING

BACKGROUND

Aspects described herein relate to alignment tooling, and more specifically, to alignment tooling for large structures with tight-tolerance fastener holes for coupling.

SUMMARY

According to one aspect, a method for aligning a first component and a second component is provided. The first component includes a first plurality of fastener holes and the second component includes a second plurality of fastener holes. The first plurality of fastener holes and the second plurality of fastener holes are alignable to receive fasteners that join the first component and the second component. The method includes attaching a first reference plate to at least two of the fastener holes of the first plurality of fastener holes in the first component. The method also includes aligning mating features of a first alignment device with cooperating mating features of the first reference plate, thereby placing the at least two fastener holes and the first alignment device in a predefined relative arrangement. The method also includes attaching the first alignment device to the first component after having placed the at least two fastener holes and the first alignment device in the predefined relative arrangement. The method also includes attaching a second reference plate to at least two of the fastener holes of the second plurality of fastener holes in the second component. The method also includes aligning mating features of a second alignment device with cooperating mating features of the second reference plate, thereby placing the at least two fastener holes and the second alignment device in a predefined relative arrangement. The method also includes, attaching the second alignment device to the second component after having placed the at least two fastener holes and the second alignment device in the predefined relative arrangement. The method also includes mating a first alignment feature of the first alignment device and a cooperating second alignment feature of the second alignment device to urge the first plurality of holes in the first component and the second plurality of holes in the second component into alignment.

According to one aspect, an alignment fixture for aligning a first component and a second component is provided. The first component includes a first plurality of fastener holes and the second component includes a second plurality of fastener holes. The first plurality of fastener holes and the second plurality of fastener holes are aligned to receive fasteners that join the first component and the second component. The alignment fixture includes a first mating fixture. The first mating fixture includes a first reference plate adapted to align with at least two of the first plurality of fastener holes in the first component and including a first reference plate mating feature. The first mating fixture also includes a first alignment device. The first alignment device includes a first alignment device mating feature adapted to cooperatively engage the first reference plate mating feature to align the first alignment device with the first reference plate, thereby placing the at least two fastener holes and the first alignment device in a predefined relative arrangement. The first alignment device also includes a first alignment feature. The first alignment device is adapted to be coupled to a surface of the first component when the first alignment device and the at least two fastener holes are in the pre- defined relative arrangement. The alignment fixture also includes a second mating fixture. The second mating fixture includes a second reference plate adapted to align with at least two of the first plurality of fastener holes in the second component and including a second reference plate mating feature. The second mating fixture also includes a second alignment device. The second alignment device includes a second alignment device mating feature adapted to cooperatively engage the second reference plate mating feature to align the second alignment device with the second reference plate, thereby placing the at least two fastener holes and the second alignment device in a predefined relative arrangement. The second alignment device also includes a second alignment feature. The second alignment device is adapted to be coupled to a surface of the second component when the second alignment device and the at least two fastener holes are in the predefined relative arrangement. The first alignment feature engages the second alignment feature when the first component and the second component are brought together, and wherein engagement of the first alignment feature and the second alignment feature urges the first component and the second component into alignment.

According to one aspect, an alignment tool for aligning a first component and a second component is provided. The first component and the second component include a first array of fastener holes and a second array of fastener holes, respectively. The first component and the second component are attached by installing fasteners in the aligned first and second arrays of fastener holes. The alignment tool includes a first mating fixture. The first mating fixture includes a first indexing feature that aligns with at least two of the first array of fastener holes in the first component. The first mating fixture also includes a first two-part body. The first two-part body includes a first part that engages the first indexing feature such that the first part is aligned with the at least two of the first array of fastener holes in the first component. The first two-part body also includes a second part that is alignable with the first part to transfer the alignment with the at least two of the first array of fastener holes from the first part to the second part. The first mating fixture also includes a second indexing feature that couples the second part to the first component. The first mating fixture also includes a first alignment feature extending from the second part. The alignment tool also includes a second mating fixture. The second mating fixture includes a third indexing feature that aligns with at least two of the second array of fastener holes in the second component. The second mating fixture also includes a second two-part body. The second two-part body includes a third part that engages the third indexing feature such that the third part is aligned with the at least two of the second array of fastener holes in the second component. The second two-part body also includes a fourth part that is alignable with the third part to transfer the alignment with the at least two of the second array of fastener holes from the first part to the fourth part. The second mating fixture also includes a fourth indexing feature that couples the fourth part to the second component. The second mating fixture also includes a second alignment feature extending from the second part. The first alignment feature and the second alignment feature are engageable to urge the first array of fastener holes in the first component and the second array of fastener holes in the second component into alignment.

BRIEF DESCRIPTION OF THE SEVERAL VIEWS OF THE DRAWINGS

FIG. 1B is a side view of the two fuselage sections of FIG. 1A mated together, wherein certain features are shown in hidden line;

FIG. 1C is a perspective view from within a fuselage section, wherein a stringer end fitting is arranged at a joint between a skin of the fuselage section and a bolt flange of the fuselage section;

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1A:
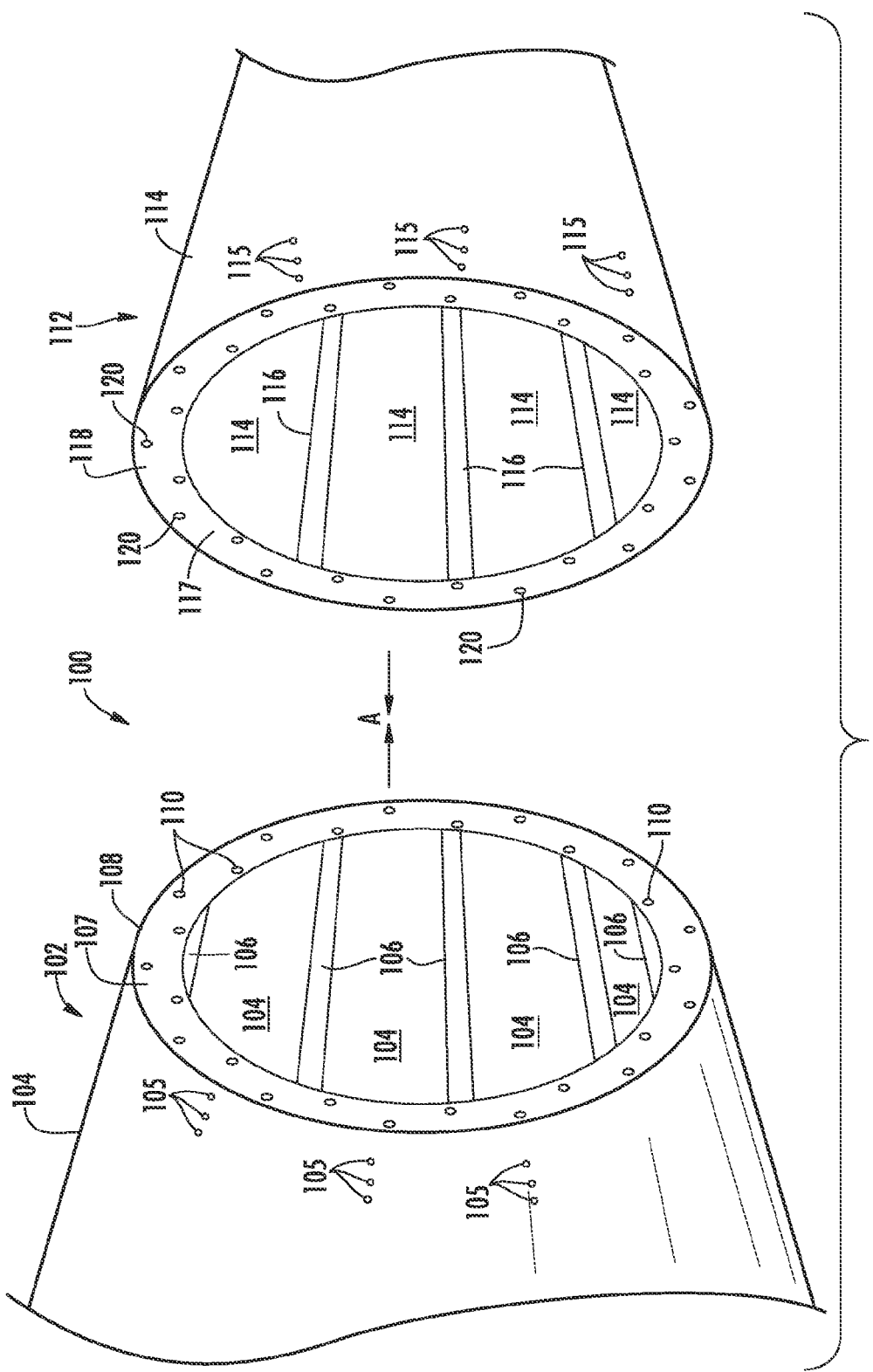
FIG. 1A is a perspective view of two fuselage sections being moved toward one another for assembly.

In various manufacturing scenarios, large components must be aligned relative to one another with a high degree of precision to allow the components to be fastened together. For example, FIG. 1A illustrates a fuselage assembly 100 for an aircraft. The fuselage assembly 100 includes a first component 102 (e.g., a first fuselage component) and a second component 112 (e.g., a second fuselage component). The first component 102 includes a skin 104 arranged over stringers 106 (or other frame members). The first component 102 also includes a first flange 108 at an end of the first component 102. The first flange 108 includes an array or plurality of fastener holes 110 arranged thereon. The second component 112 also includes a skin 114 arranged over stringers 116 (or other frame members). The second component 112 also includes a second flange 118 at an end of the second component 112. The second flange 118 includes an array or plurality of fastener holes 120 arranged thereon. The array of fastener holes 110 in the first flange 108 and the array of fastener holes 120 in the second flange 118 are arranged so that the fastener holes 110 and 120 are aligned when the first component 102 in the second component 112 are aligned.

FIG. 1B illustrates the first component 102 and the second component 112 mated together. In the mated position, the first flange 108 and the second flange 118 abut one another. As shown, in various circumstances, the stringers 106 are arranged around the first flange 108 at positions that align with positions of the stringers 116 around the second flange 118 such that the stringers 106 and 116 are aligned when the first component 102 and the second component 112 are mated together. In various circumstances, the first component 102 and/or the second component 112 can include stringer end fittings 130 arranged between the stringers 106 and 116. Each stringer end fitting 130 abuts the interior of the fuselage skin and the flange of one of the components. For example, referring to FIG. 1C, a stringer end fitting 130 is arranged in the first component 102 and abuts the interior of the fuselage skin 104 and an interior surface 109 of the first flange. Similarly, a stringer end fitting 130 is arranged in the second component 112 and abuts the interior of the fuselage skin 114 and an interior surface of the second flange 118. The stringer end fittings 130 can be attached to the skins 104 and 114 by rivets 132 or other fasteners. The stringer end fittings 130 limit flexing between the flange 108 and the fuselage skin 104 of the first component 102 and flexing between the flange 118 and the fuselage skin 114 of the second component 112.

Figure 1D:
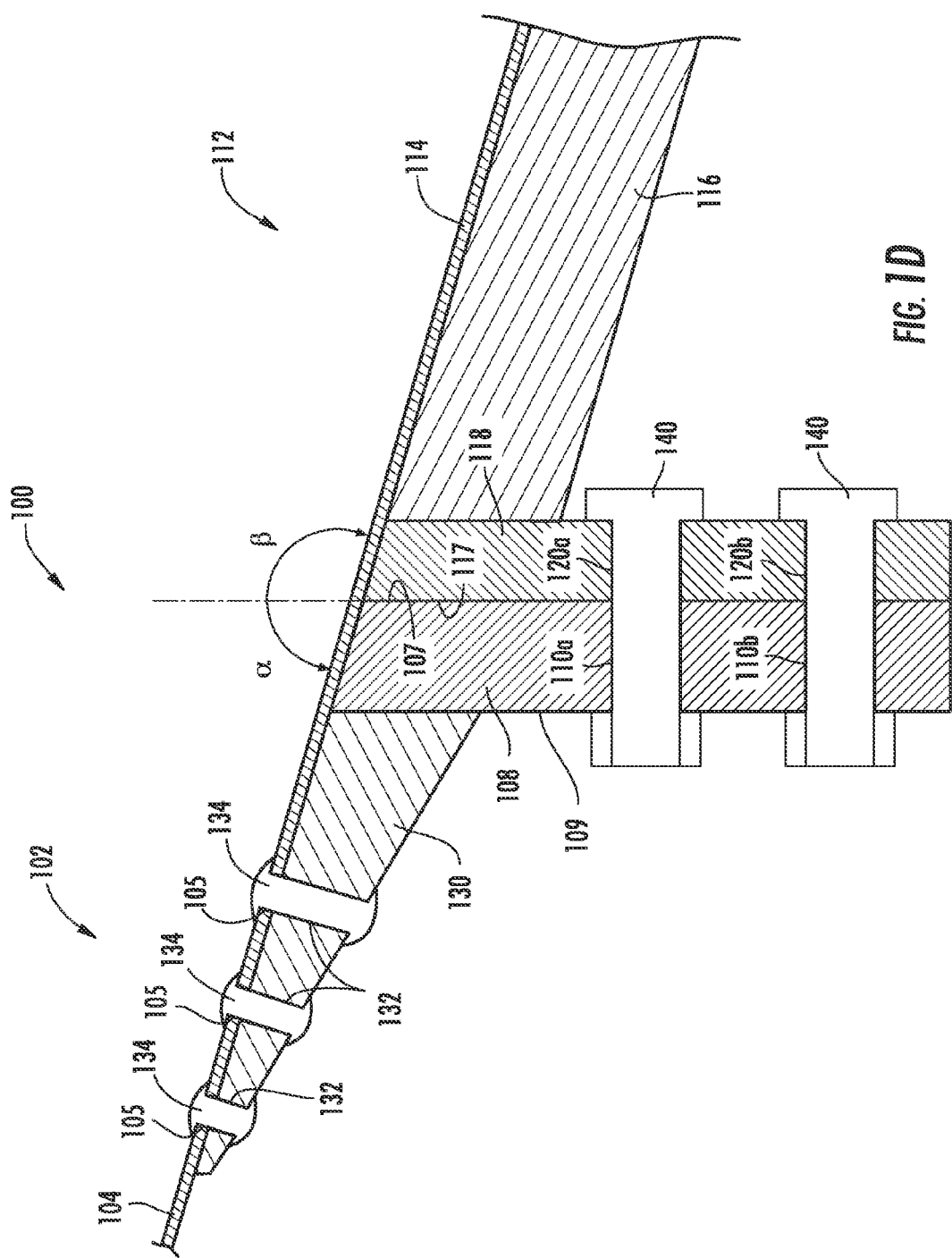
FIG. 1D is partial cross-sectional detail side view of a portion of the two fuselage sections shown in FIG. 1A, showing flanges of the two fuselage sections abutting one another and a fixed relative to one another by fasteners passing through fastener holes, wherein a stringer shown in FIG. 1B is replaced with a stringer end fitting for illustration purposes.

Referring to FIG. 1D, the first component 102 and the second component 112 are aligned when an outward facing surface 107 of the first flange 108 and an outward facing surface 117 of the second flange 118 are abutting and the array of fastener holes 110 in the first flange 108 align with the array of fastener holes 120 in the second flange 118. Once the first component 102 and the second component 112 are aligned, fasteners 140 can be inserted and secured through the aligned holes 110 and 120 in the flanges 108 and 118. The fasteners 140 could be bolts, rivets, or the like. FIG. 1D is a cross-sectional detail side view of the mated first component 102 and second component 112 shown in FIG. 1B. For purposes of illustrating details of a stringer 116 and a stringer end fitting 130, FIG. 1D shows a stringer end fitting 130 in place of the stringer 106 in the first component 102.

The illustrated first component 102 and the second component 112 are forming a tapered portion of the fuselage 100. Put differently, a diameter or other cross-sectional dimension of the skin of the fuselage 100 is changing along a longitudinal axis L-L (shown in FIG. 1B) of the first component 102 and the second component 112. For example, the cross-sectional dimension of the skin 104 of the first component 102 gets larger at greater distances away from the first flange 108 along the longitudinal axis L-L. The cross-sectional dimension of the skin 114 of the second component 112 gets smaller at greater distances away from the second flange 118 along the longitudinal axis L-L. The flanges 108 and 118 are arranged perpendicular to the longitudinal axis to abut one another (as shown in FIG. 1B). Thus, the skin 104 of the first component 102 can be arranged at an angle α relative to the outward facing surface 107 of the first flange 108. The skin 114 of the second component 112 can be arranged at an angle β relative to the outward facing surface 117 of the second flange 118. In this illustrated scenario in which the fuselage 100 is tapered, the angle α is less than 90° and the angle β is greater than 90°. In various other scenarios, the angle α could be greater than 90° and the angle β could be less than 90°. In various other scenarios in which the fuselage 100 is not tapered, the angle α and the angle β would each be 90°.

Referring again to FIG. 1A, to attach the first component 102 and the second component 112, the first component 102 and the second component 112 are moved toward one another in the direction of arrows A. For example, the first component 102 could be stationary (e.g., could be mounted to a fixture) and the second component 112 could be moved toward the first component 102. For example, the second component 112 could be mounted on a cart or the like that can be maneuvered to position the second component 112 into alignment with the first component 102. Currently, to align the first component 102 and the second component 112, a worker is positioned within the first component 102 where the alignment between the first array of fastener holes 110 and the second array of fastener holes 120 can be visualized. The worker calls out positioning instructions to another worker or workers outside of the fuselage 100 who are maneuvering the second component 112. This process, using positioning instructions, can be laborious and time-consuming.

According to various aspects described herein, first and second portions of an alignment fixture are temporarily mounted to the exteriors of the first component 102 and the second component 112. The first and second portions of the alignment fixture provide a visual reference for workers outside of the fuselage 100 who are maneuvering the second component 112 relative to the first component 102. Also, the first and second portions of the alignment fixture engage one another to align the first component 102 and the second component 112. In this way, the first and second portions of the alignment fixture ensure proper alignment the first component 102 and the second component 112.

Figure 2:
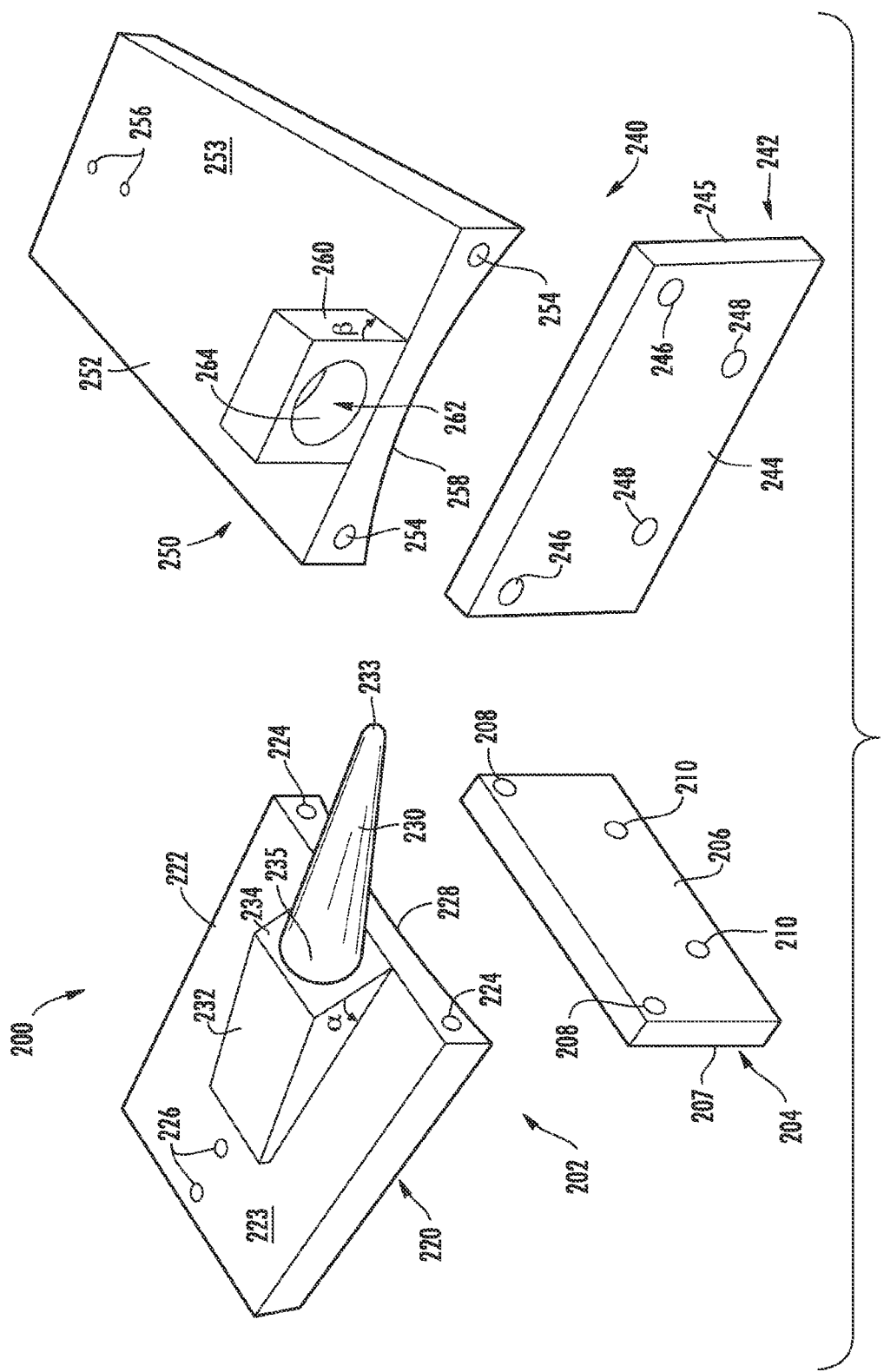
FIG. 2 is a perspective exploded view of an alignment fixture that can be attached to the two fuselage sections shown in FIG. 1A.

FIG. 2 is a perspective view of an alignment fixture 200 according to one aspect that can be attached to the first component 102 and the second component of the fuselage 100. The alignment fixture 200 includes a first mating fixture 202 that can be attached to the first component 102 and a second mating fixture 240 that can be attached to the second component 112. The first mating fixture 202 includes a first reference plate 204 and a first alignment device 220. The first reference plate 204 and first alignment device 220 can be aligned with one another by holes 208 through a body 206 of the first reference plate 204 and holes 224 in a body 222 of the first alignment device 220. Pins, bolts, temporary spring-loaded fasteners, or the like can be arranged in the holes 208 and 224 to align and fasten the first reference plate 204 to the first alignment device 220. In various aspects (described in greater detail below with reference to FIGS. 8A-8C and 9A-9C), the body 206 of the first reference plate 204 and the body 222 of the first alignment device 220 can include keyed features (e.g., keyed surfaces) that only engage in one particular orientation to provide alignment between the first reference plate 204 and the first alignment device 220. The first alignment device 220 includes fastener holes 226 through the body 222 that receive fasteners that temporarily attach the first alignment device 220 to the skin 104 of the first component (described in greater detail below). The first alignment device 220 includes a bracket 232 extending from an upper surface 223 of the body 222. The bracket 232 provides a surface 234 arranged at an angle α relative to the surface 223 of the body 222, where the surface 234 supports an alignment feature 230 (e.g., a bull nose alignment feature) that extends along the longitudinal axis L-L. In the illustrated aspect, the bull nose alignment feature 230 is a generally frustoconical (or other shape) element that gradually increases from a small circumference at a tip 233 to a larger circumference at a base 235 of the alignment feature 230.

The second mating fixture 240 includes a second reference plate 242 and a second alignment device 250. The second reference plate 242 and the second alignment device 250 can be aligned with one another by holes 246 through a body 244 of the second reference plate 242 and holes 254 in the body 252 of the second alignment device 250. Pins, bolts, temporary spring-loaded fasteners, or the like can be arranged in the holes 246 and 254 to align and fasten the second reference plate 242 to the second alignment device 250. In various aspects (described in greater detail with reference to FIGS. 8A-8C and 9A-9C), the body 244 of the second reference plate 242 and the body 252 of the second alignment device 250 can include keyed features that only engage in one particular orientation to provide alignment between the second reference plate 242 and the second alignment device 250. The second alignment device 250 includes fastener holes 256 through the body 252 that receive fasteners that temporarily attach the second alignment device 250 to the skin 114 of the second component (described in greater detail below). The second alignment device 250 includes a bracket 260 extending from an upper surface 253 of the body 252. The bracket 260 includes an aperture 262 passing therethrough. The aperture 262 includes an interior surface 264 that is engaged by the base 235 of the alignment feature 230 or a region of the alignment feature 230 toward the base 235 of the first alignment device 220. Put differently, the tip 233 of the alignment feature 230 is smaller than the aperture 262 and can therefore pass through the aperture 262. As the end of the bull nose alignment feature 230 toward the base 235 enters the aperture 262, the interior surface 264 of the aperture 262 abuts the bull nose alignment feature 230. Accordingly, the aperture 262 can be referred to as an alignment feature of the second alignment device 250.

In various aspects, the alignment feature 230 and the aperture 262 are made of a rigid, durable material that can withstand multiple uses. For example, the alignment feature 230 and the aperture 262 could be made of a steel alloy.

Figure 3A:
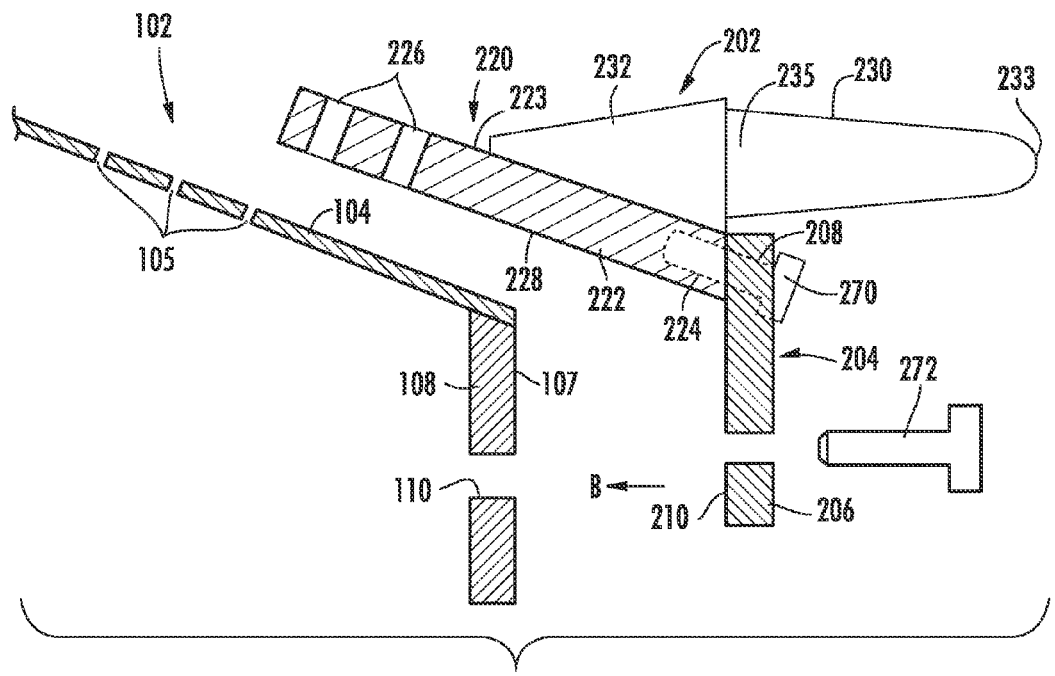
FIG. 3A is a partial cross-sectional side view of a portion of a first fuselage section with a first mating fixture of the alignment fixture shown in FIG. 2 being positioned on the first fuselage section.
Figure 3B:
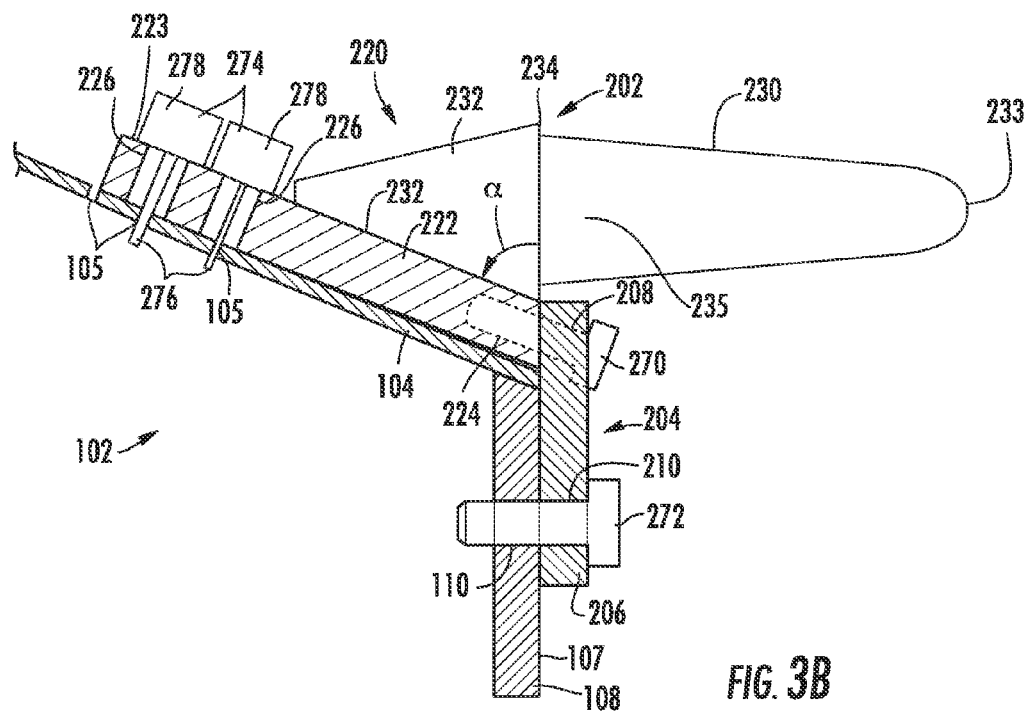
FIG. 3B is a partial cross-sectional side view of the portion of the first fuselage section shown in FIG. 3A with the first mating fixture of the alignment fixture positioned on the first fuselage section.
Figure 3C:
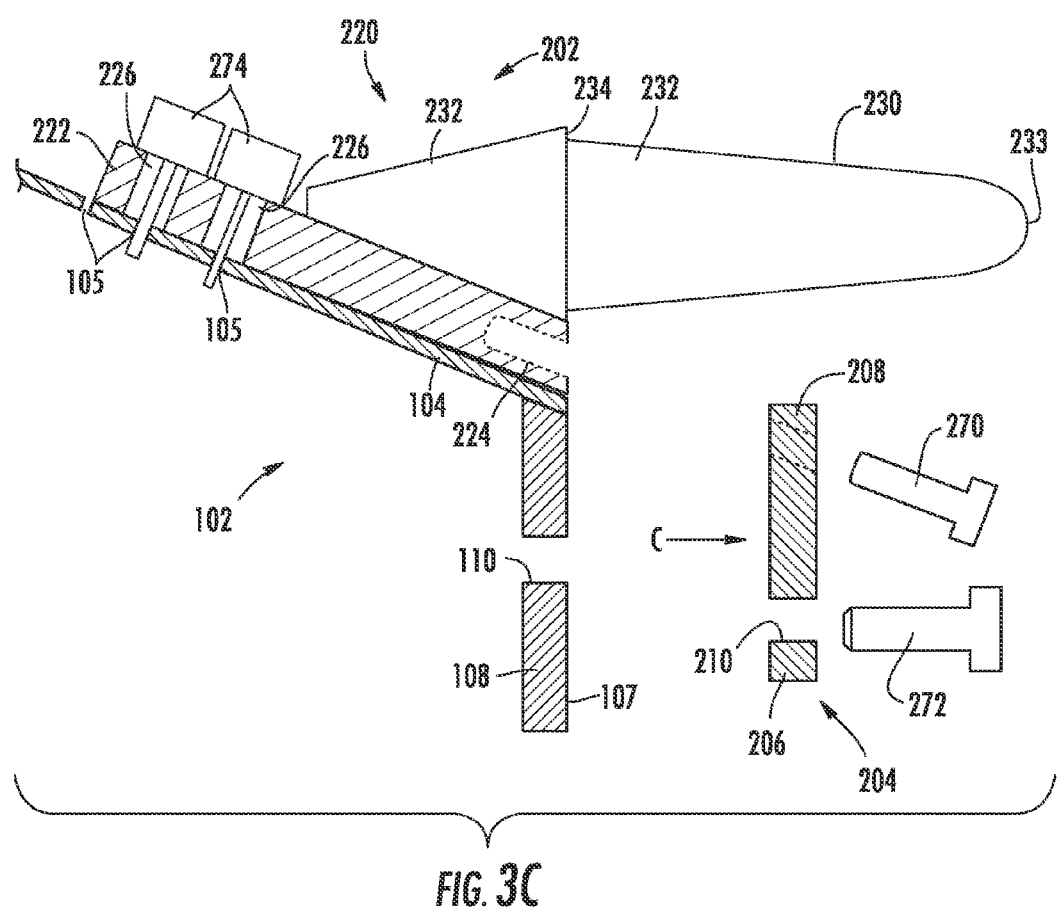
FIG. 3C is a partial cross-sectional side view of the portion of the first fuselage section shown in FIG. 3A with a first reference plate of the first mating fixture removed.

Referring to FIGS. 3A-3C the first mating fixture 202 can be arranged on the first component 102 of the fuselage 100. FIG. 3A illustrates the first mating fixture 202 being positioned on the first component 102 in the direction of arrow B. As shown in FIG. 3A, the first reference plate 204 and the first alignment device 220 are aligned and attached to each other with fasteners 270 passing through the holes 208 in the body 206 of the first reference plate 204 and the holes 224 in the body 222 of the first alignment device 220. Accordingly, the holes 208 can be referred to as a first reference plate mating feature, and the holes 224 can be referred to as a first alignment device mating feature. As shown in FIG. 3B, the first reference plate 204 is positioned on the first component 102 so that the body 206 abuts the outward facing surface 107 of the first flange 108 of the first component 102. The body 206 of the first reference plate 204 includes alignment holes 210 arranged to match an arrangement of certain fastener holes of the array of fastener holes 110 of the first flange 108. Once the first reference plate 204 is abutting the first flange 108 and the holes 210 in the first reference plate 204 are aligned relative to the matching certain fastener holes of the array of fastener holes 110 of the first flange 108, fasteners 272 can be arranged in the holes 210 and 110 to temporarily attach the first reference plate 204 to the first flange 108. Now, the first reference plate 204 is aligned relative to the certain fastener holes of the array of fastener holes 110 of the first flange 108. In the aspect shown in FIG. 2, the first reference plate 204 includes two alignment holes 210. In various other aspects, the first reference plate 204 could include more than two alignment holes 210.

As discussed above, the first alignment device 220 is attached to and aligned relative to the first reference plate 204 via fasteners 270 passing through holes 208 in the first reference plate 204 and holes 224 in the first alignment device 220. In various aspects, the first alignment device 220 could be attached and aligned relative to the first reference plate 204 after the first reference plate 204 has been attached to the first flange 108 with the fasteners 272. As shown in FIG. 3B, the first alignment device 220 is resting on the first component 102. The body 222 of the first alignment device 220 can include a curved surface 228 (shown in FIG. 2) that matches a profile of the skin 104 of the first component 102. When the first reference plate 204 is attached to the first flange 108 via the certain fastener holes 110 in the first flange 108, the first reference plate 204 is aligned relative to the certain fastener holes of the array of fastener holes 110. Since the first alignment device 220 is attached to and aligned relative to the first reference plate 204, the first alignment device 220 is also aligned in a predefined relative arrangement with the certain fastener holes of the array of fastener holes 110.

Now that the first alignment device 220 is aligned relative to the certain fastener holes 110, the first alignment device 220 can be temporarily attached to the skin 104 of the first component using one or more temporary spring-loaded fasteners 274, which are inserted into the fastener holes 226 in the body 222 of the first alignment device 220 and into fastener holes 105 in the skin 104 (that are later used with fasteners 134 to secure stringer end fittings 130, described above). In the aspect shown in FIGS. 2 and 3A-3C, two temporary spring-loaded fasteners 274 are used. The temporary spring-loaded fasteners 274 are also known as CLEKO® fasteners, wedge lock fasteners, quick lock fasteners, or reusable rivet fasteners. In various aspects, any type of temporary fastener that can securely attach the first alignment device 220 to the skin 104 could be used. The temporary spring-loaded fasteners 274 include an upper portion 278 that clamps down on an upper surface 223 of the body 222 of the first alignment device 220 and a lower portion 276 that extends through the holes 105 in the skin 104. The upper portion 278 and the lower portion 276 of the temporary spring-loaded fasteners 274 clamp the body 222 of the first alignment device 220 and the skin 104 of the first component 102 together such that the first alignment device 220 is securely positioned on the skin 104 of the first component 102. As can be seen in FIG. 3B, the holes 105 in the skin 104 of the first component 102 are smaller than the holes 226 in the body 222 of the first alignment device 220. The relatively small holes 105 in the skin 104 of the first component 102 can provide a close-tolerance fit with the lower portion 276 of the temporary spring-loaded fasteners 274 while the relatively large holes 226 in the body 222 of the first alignment device 220 allow for a range of possible positions for the first alignment device 220 relative to the skin 104 in which the holes 105 in the skin 104 and the fastener holes 226 in the body 222 of the first alignment device 220 are aligned (i.e., a range of positions in which the holes 105 and 226 overlap). As a result, the first alignment device 220 can be positioned so that it is aligned relative to the fastener holes 110 (described above) and the holes 105 and 226 are aligned for the temporary spring-loaded fasteners 274.

As shown in FIG. 3B, the first reference plate 204 (and the fasteners 270 and 272) covers a portion of the outward facing surface 107 of the first flange 108 of the first component 102. As a result, the first flange 108 cannot abut the second flange 118 of the second component 112. Referring now to FIG. 3C, after the temporary spring-loaded fasteners 274 are in place such that the first alignment device 220 is securely positioned (and aligned relative to the fastener holes 110 in the first flange 108 of the first component 102), the first reference plate 204 can be removed from the first flange 108. The fasteners 270 are removed from the holes 208 in the first reference plate 204 and the holes 224 in the first alignment device 220 to decouple the first reference plate 204 from the first alignment device 220. The fasteners 272 are removed from the holes 210 in the first reference plate 204 and the fastener holes 110 in the first flange 108 of the first component 102. Thereafter, the first reference plate 204 can be removed from the first component 102, leaving the outward facing surface 107 of the first flange 108 unobstructed.

Referring again to FIG. 3B, the bracket 232 on the body 222 of the first alignment device 220 includes the surface 234 with the alignment feature 230 extending therefrom. The surface 234 on the bracket 232 can be arranged at the angle α relative to the surface 232 of the body 222 of the first alignment device 220. By arranging the surface 234 at the angle α, the alignment feature 230 is oriented along the longitudinal axis of the fuselage 100. Put differently, the angle α of the surface 234 of the bracket 232 compensates for the taper of the skin 104 (tapered at the angle α) of the first component 102.

Figure 4A:
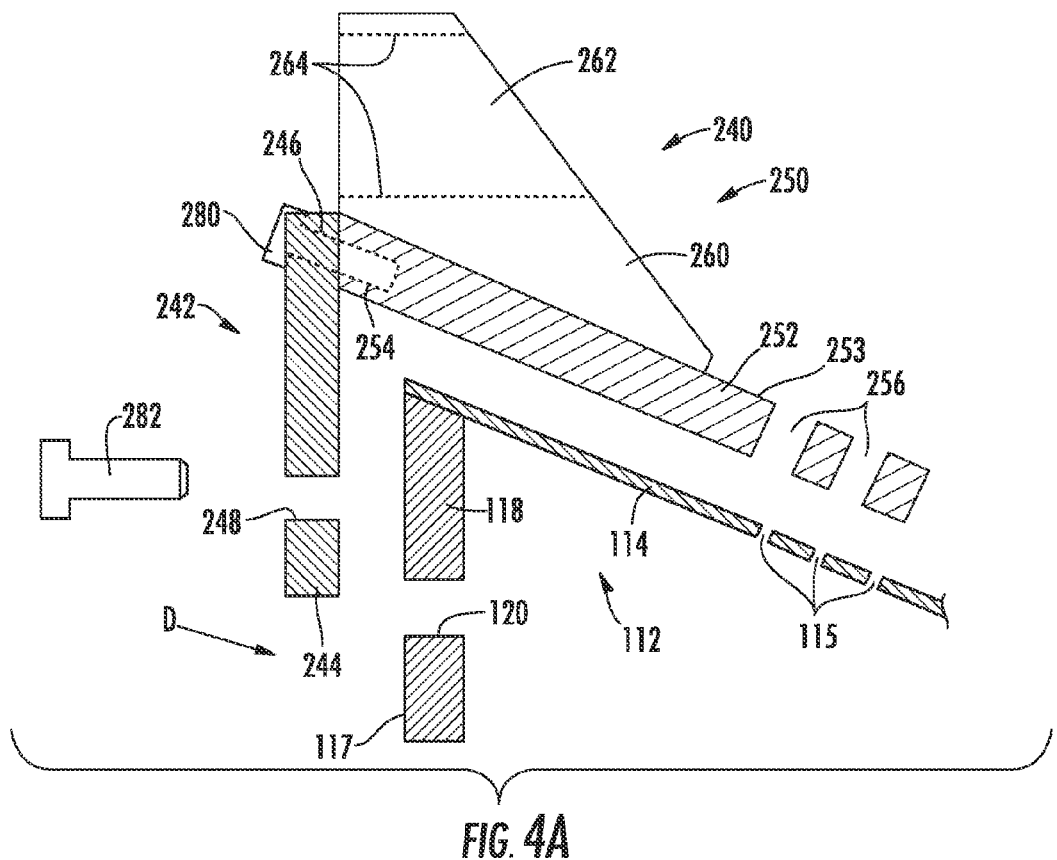
FIG. 4A is a partial cross-sectional side view of a portion of a second fuselage section shown in FIG. 1A with a second mating fixture of the alignment fixture shown in FIG. 2 being positioned on the second fuselage section.
Figure 4B:
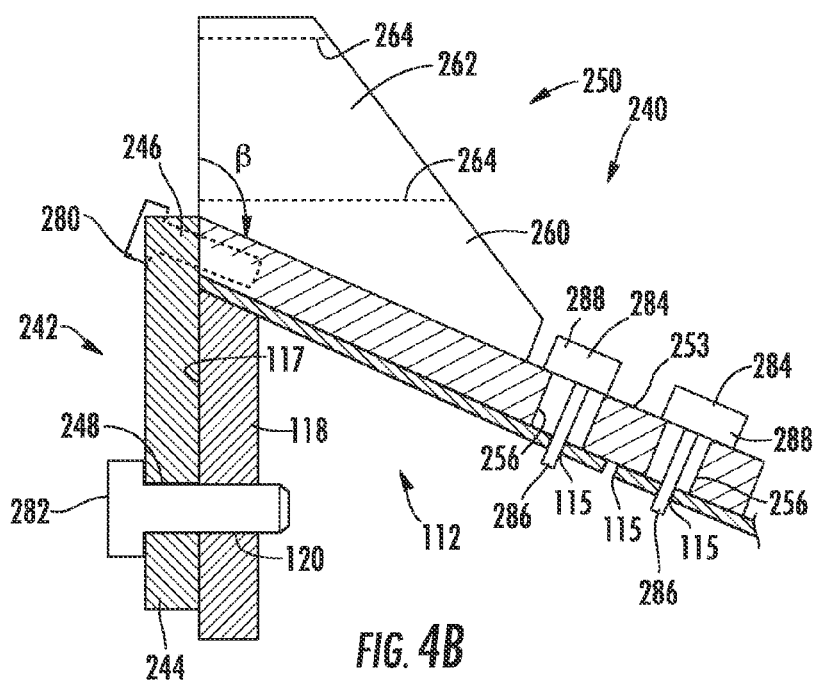
FIG. 4B is a partial cross-sectional side view of the portion of the second fuselage section shown in FIG. 4A with the second mating fixture of the alignment fixture positioned on the second fuselage section.
Figure 4C:
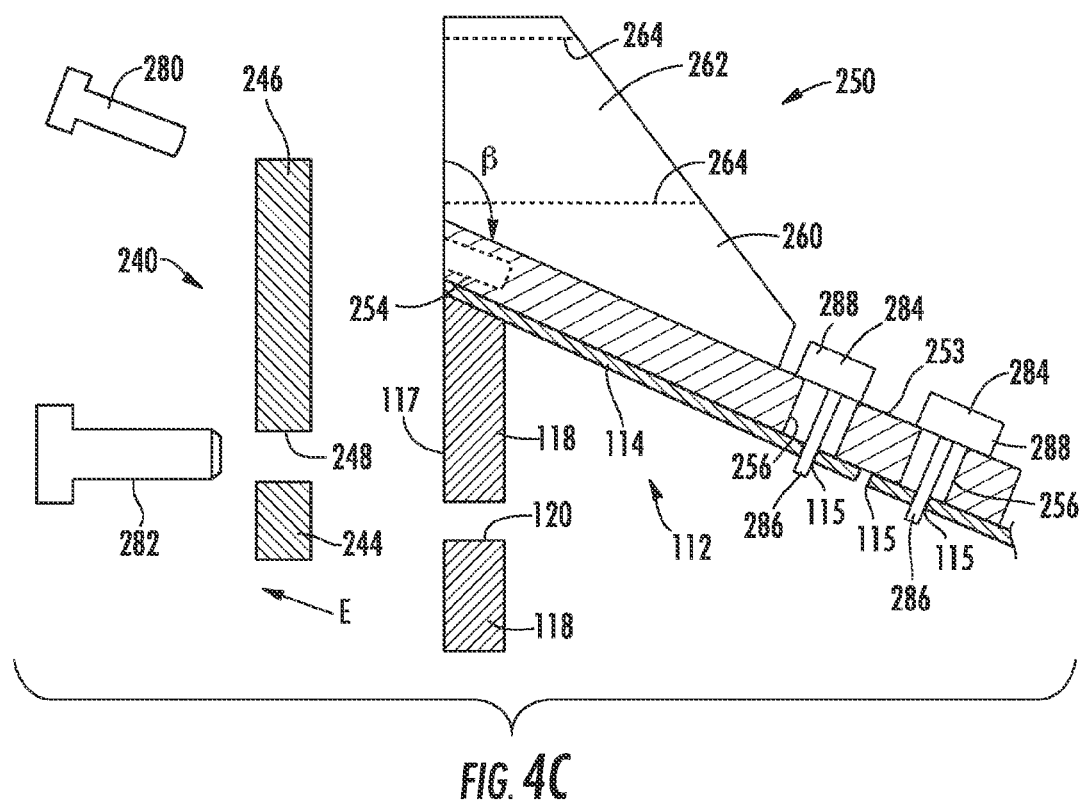
FIG. 4C is a partial cross-sectional side view of a portion of the second fuselage section shown in FIG. 4A with a second reference plate of the second mating fixture removed.

Referring to FIGS. 4A-4C, the second mating fixture 240 can be arranged on the second component 112 of the fuselage 100. FIG. 4A illustrates the second mating fixture 240 being positioned on the second component 112 in the direction of arrow D. As shown in FIG. 4A, the second reference plate 242 and the second alignment device 250 are already aligned and attached to each other with fasteners 280 passing through the holes 246 in the body 244 of the second reference plate 242 and the holes 254 in the body 252 of the second alignment device 250. Accordingly, the holes 246 can be referred to as a second reference plate mating feature, and the holes 254 can be referred to as a second alignment device mating feature.

As shown in FIG. 4B, the second reference plate 242 is positioned so that the body 244 abuts the outward facing surface 117 of the second flange 118 of the second component 112. The body 244 of the second reference plate 242 includes alignment holes 248 arranged on the body 244 to match an arrangement of certain fastener holes of the array of fastener holes 120 of the second flange 118. Once the second reference plate 242 is abutting the second flange 118 and the holes 248 in the second reference plate 242 are aligned relative to the matching certain fastener holes of the array of fastener holes 120 of the second flange 118, fasteners 282 can be arranged in the holes 248 and 120 to affix the second reference plate 242 to the second flange 118. Now, the second reference plate 242 is aligned relative to the certain fastener holes of the array of fastener holes 120 of the second flange 118. In the aspect shown in FIG. 2, the second reference plate 242 includes two alignment holes 248. In various other aspects, the second reference plate 242 could include more than two alignment holes 248. As discussed above, the first flange 108 and the second flange 118 have matching arrays of fastener holes 110 and 120. In various aspects in which the first reference plate 204 is arranged to align with a particular two or more of the array of fastener holes 110 in the first flange 108 of the first component 102, the second reference plate 242 is arranged to align with the matching particular two or more of the array of fastener holes 120 in the second flange 118 of the second component 112.

As discussed above, the second alignment device 250 is attached and aligned relative to the second reference plate 242 via fasteners 280 passing through holes 246 in the second reference plate 242 and holes 254 in the second alignment device 250. In various aspects, the second alignment device 250 could be attached and aligned relative to the second reference plate 242 after the second reference plate 242 has been attached to the second flange 118 with the fasteners 282. As shown in FIG. 4B, the second alignment device 250 rests on the second component 112. The body 252 of the second alignment device 250 can include a curved surface 258 (shown in FIG. 2) that matches a profile of the skin 114 of the second component 112. When the second reference plate 242 is attached to the second flange 118 via the certain fastener holes 120 in the second flange 118, the second reference plate 242 is aligned relative to the certain fastener holes of the array of fastener holes 120. Since the second alignment device 250 is attached to and aligned relative to the second reference plate 242, the second alignment device 250 is also aligned in a predefined relative arrangement with the certain fastener holes of the array of fastener holes 120.

Now that the second alignment device 250 is aligned relative to the certain fastener holes of the array of fastener holes 120, the second alignment device 250 can be temporarily attached to the skin 114 of the second component 112 using one or more temporary spring-loaded fasteners 284, which are inserted into the fastener holes 256 in the body 252 of the second alignment device 250 and into fastener holes 115 in the skin 114 (that are later used with fasteners to secure stringer end fittings, described above). In the aspect shown in FIGS. 2 and 4A-4C, two temporary spring-loaded fasteners 284 are used. The temporary spring-loaded fasteners 284 include an upper portion 288 that clamps down on the upper surface 253 of the body 252 of the second alignment device 250 and a lower portion 286 that extends through the holes 115 in the skin 114. The upper portion 288 and the lower portion 286 of the temporary spring-loaded fasteners 284 clamp the body 252 of the second alignment device 250 and the skin 114 of the second component 112 together such that the second alignment device 250 is securely positioned on the skin 114 of the second component 112. As can be seen in FIG. 4B, the holes 115 in the skin 114 of the second component are smaller than the holes 256. The relatively small holes 115 in the skin 114 of the second component can provide a close-tolerance fit with the lower portion 286 of the temporary spring-loaded fasteners 284 while the relatively large holes 256 in the body 252 of the second alignment device 250 allow for a range of possible positions for the second alignment device 250 relative to the skin 114 in which the holes 115 in the skin 114 and the fastener holes 256 in the body 252 of the second alignment device 250 are aligned (i.e., the holes 115 and 256 overlap). As a result, the second alignment device 250 can be positioned so that it is aligned relative to the fastener holes 120

(described above) and the holes 115 and 256 are aligned for the temporary spring-loaded fasteners 284.

As shown in FIG. 4B, the second reference plate 242 (and the fasteners 280 and 282) is covering a portion of the outward facing surface 117 of the second flange 118 of the second component 112. As a result, the second flange 118 cannot abut the first flange 108 of the first component 102. Referring now to FIG. 4C, after the temporary spring-loaded fasteners 284 are in place such that the second alignment device 250 is securely positioned (and aligned relative to the fastener holes 120 in the second flange 118 of the second component 112), the second reference plate 242 can be removed from the second flange 118. The fasteners 280 are removed from the holes 246 in the second reference plate 242 and the holes 254 in the second alignment device 250 to decouple the second reference plate 242 from the second alignment device 250. The fasteners 282 are also removed from the holes 248 in the second reference plate 242 and the fastener holes 120 in the second flange 118 of the second component 112. Thereafter, the second reference plate 242 can be removed from the second component 112, leaving the outward-facing surface 117 of the second flange 118 unobstructed.

Figure 5A:
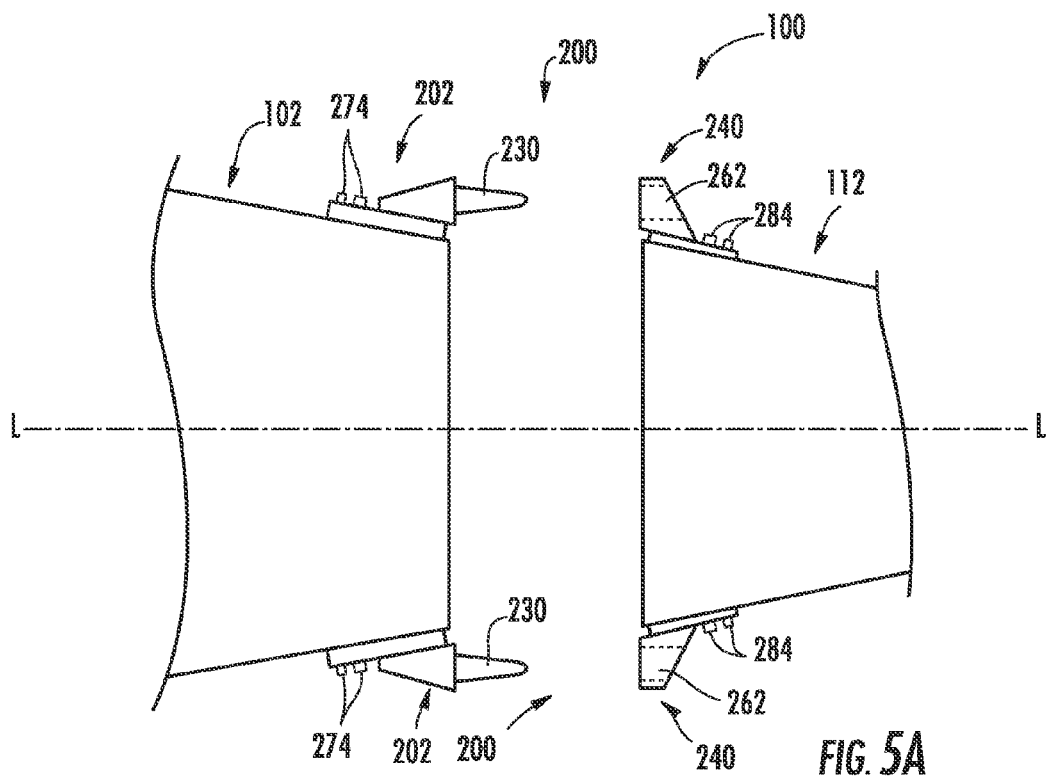
FIG. 5A is a side view of the fuselage sections shown in FIG. 1A with the first mating fixture attached to the first fuselage section and the second mating fixture attached to the second fuselage section, and wherein the first and second fuselage sections are being moved toward each other for something.
Figure 5B:
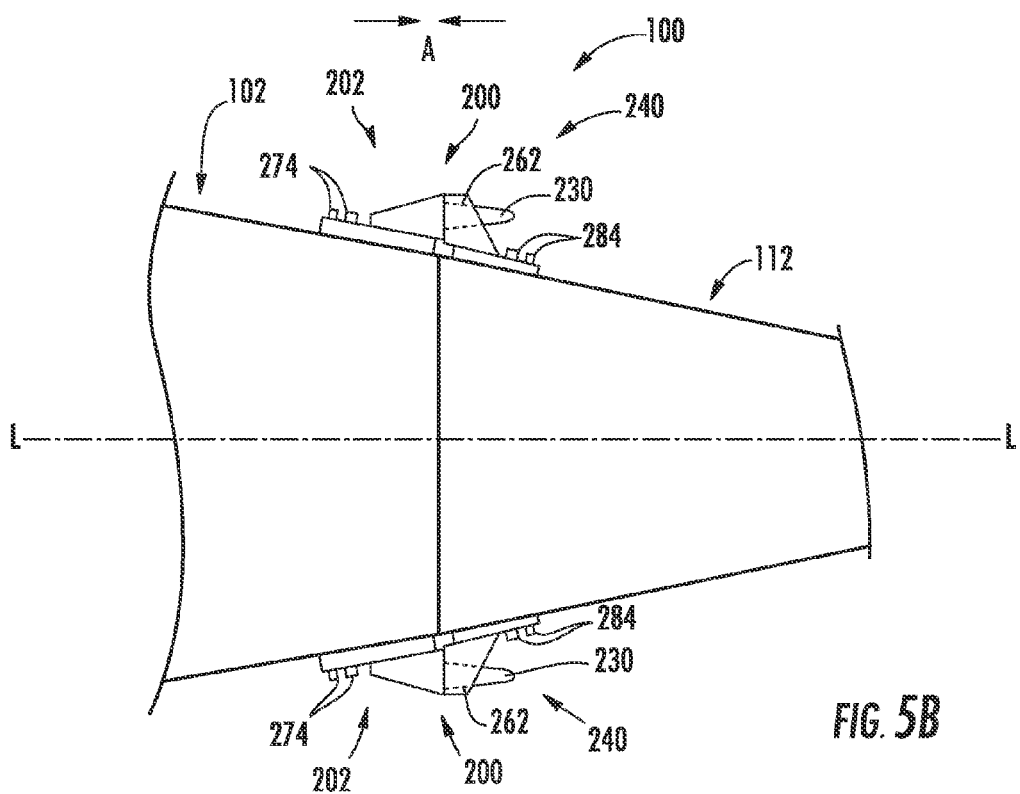
FIG. 5B is a side view of the fuselage sections shown in FIG. 5A, wherein the first mating fixture and the second mating fixture are engaged with each other and the first fuselage section and the second fuselage section are aligned relative to one another.

FIGS. 5A and 5B illustrate the first component 102 and the second component 112 of the fuselage 100 before and after alignment, respectively. FIGS. 5A and 5B illustrate two alignment fixtures 200 arranged around the periphery of the first component 102 and the second component 112. For each alignment fixture 200, the first mating fixture 202 is arranged on the first component 102 and the second mating fixture 240 is arranged on the second component 112 of the fuselage 100. The alignment features 230 of the first mating fixtures 202 extend along the longitudinal axis L-L of the fuselage 100. When the first component 102 and the second component 112 are brought together in the direction of arrows A, the alignment features 230 pass through the respective apertures 262 two guide the first component 102 and the second component 112 into alignment, as shown in FIG. 5B.

Figure 5C:
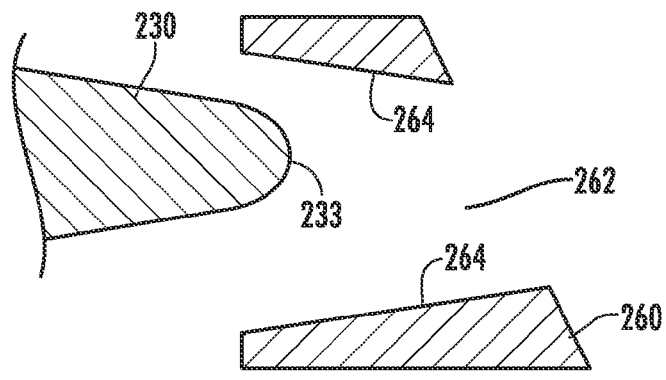
FIG. 5C is a side cross-sectional view of a portion of the first mating fixture and the second mating fixture of FIG. 2 at the beginning of an engagement process therebetween.
Figure 5D:
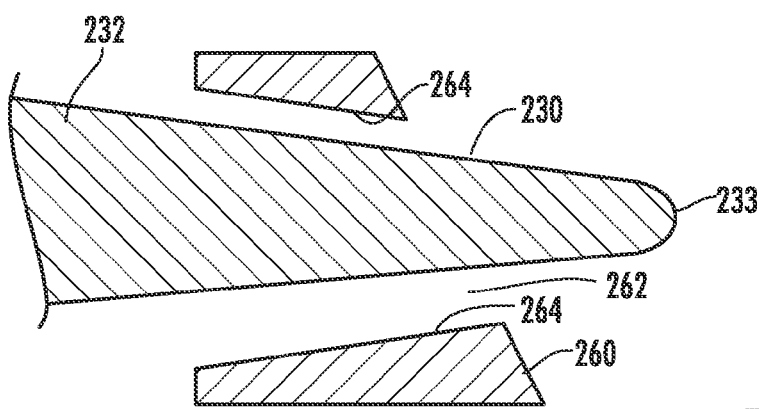
FIG. 5D is a side cross-sectional view of the portion of the first mating fixture in the second mating fixture shown in FIG. 5C in the middle of an engagement process therebetween.
Figure 5E:
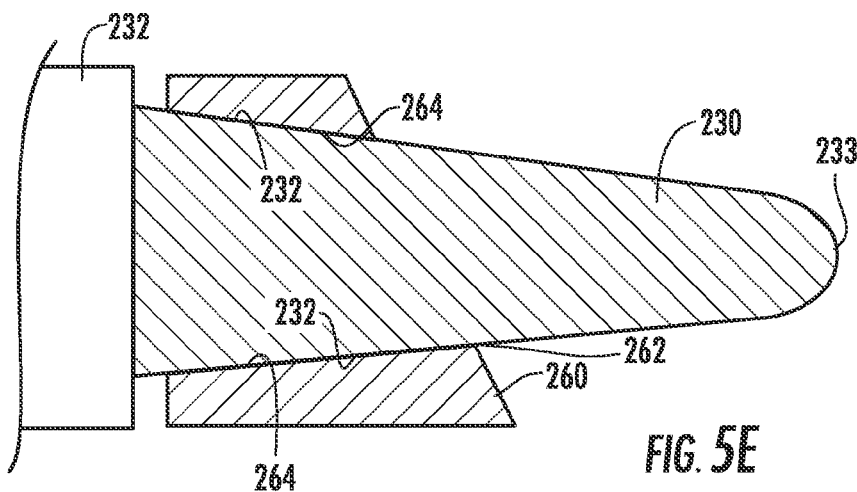
FIG. 5E is a side cross-sectional view of a portion of the first mating fixture and the second mating fixture shown in FIG. 5C in a fully engaged arrangement.

Referring now to FIGS. 5C-5E, the alignment features 230 gradually engage the apertures 262 to provide for gross alignment and then fine alignment of the first component 102 and the second component 112. FIG. 5C illustrates the beginning of engagement between the alignment feature 230 and the aperture 262 in which a tip 233 of the alignment feature 230 is positioned in the aperture 262. In this position, a relatively large gap exists between the interior surface 264 of the aperture 262 and the tip 233 of the alignment feature 230. Thus, the alignment feature 230 and the aperture 262 can begin to engage with a relatively large amount of misalignment between the first component 102 and the second component 112. FIG. 5D illustrates a middle portion of engagement between the alignment feature 230 and the aperture 262 in which a middle portion of the alignment feature 230 is positioned in the aperture 262. As discussed above, the alignment feature 230 increases in circumference from the tip 233 to the base 232. Accordingly, the gap between the interior surface 264 of the aperture 262 and the alignment feature 230 has decreased. In various circumstances, the alignment feature 230 could be touching one particular side of the interior surface 264 of the aperture 262. In such circumstances, contact forces between the interior surface 264 and the alignment feature 230 would urge the first component 102 and the second component 112 in a direction toward alignment. FIG. 5E illustrates an end portion of engagement between the alignment feature 230 and the aperture 262 in which the base 235 of the alignment feature 230 is positioned in the aperture 262 and is seated against the interior surface 264 of the aperture 262. The alignment feature 230 and the aperture 262 are sized and shaped (with suitable tolerances) so that the alignment feature 230 seats against the interior surface 264 of the aperture 262 so that the flanges 108 and 118 of the first component 102 and the second component 112, respectively, abut one another and the arrays of fastener holes 110 and 120 in the flanges 108 and 118 are aligned.

Figure 6A:
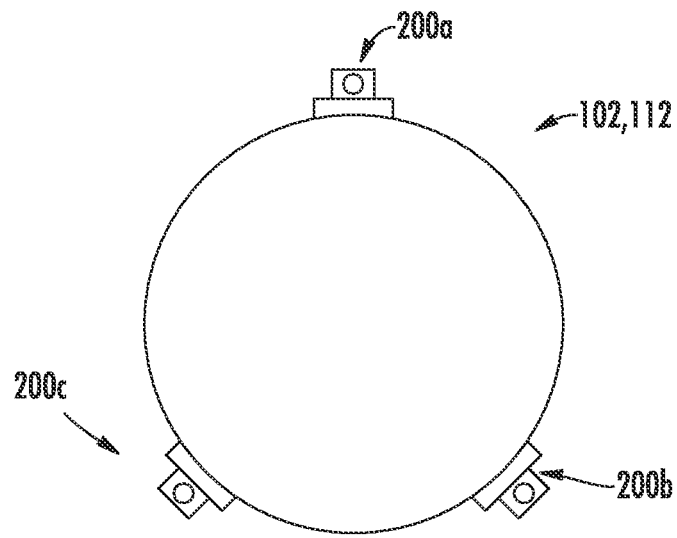
FIG. 6A is an end view of the fuselage sections shown in FIG. 1A with three alignment fixtures arranged around the peripheries of the fuselage sections.
Figure 6B:
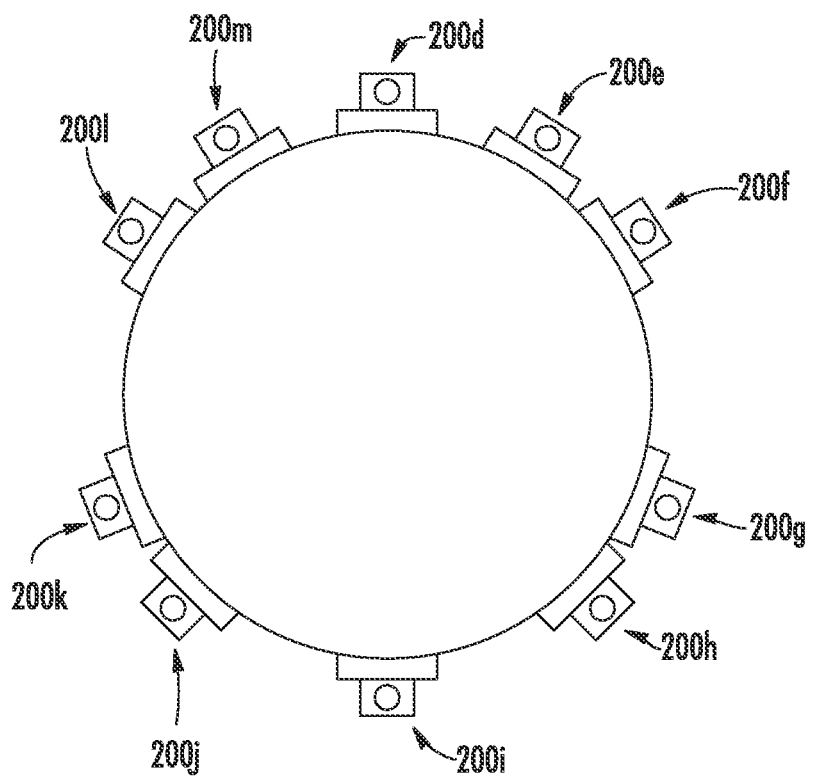
FIG. 6B is an end view of the fuselage sections shown in FIG. 1A with 10 alignment fixtures arranged around the peripheries of the fuselage sections.

Referring now to FIGS. 6A and 6B, in various aspects, three or more alignment fixtures 200 may be used to align the first component 102 and a second component 112. FIG. 6A illustrates an end view of the first component 102 and the second component 112 with three alignment fixtures 200 arranged around the periphery of the first component 102 and the second component 112. The three alignment fixtures 200 are arranged equidistant from one another. Put differently, a first alignment fixture 200a is arranged 120° away from a second alignment fixture 200b and from a third alignment fixture 200c. Similarly, the second alignment fixture 200b is arranged 120° away from the third alignment fixture 200c. FIG. 6B illustrates an end view of the first component 102 and the second component 112 with ten alignment fixtures 200 arranged around the periphery of the first component 102 and the second component 112.

In various aspects, the ten alignment fixtures 200 could be evenly spaced around the periphery of the first component 102 and the second component 112. In various other aspects, the ten alignment fixtures 200 could be clustered together. For example, FIG. 6B illustrates five alignment fixtures 200l, 200m, 200d, 200e, and 200f clustered toward a top portion of the first component 102 and the second component 112 and five alignment fixtures 200g, 200h, 200i, 200j, 200k clustered toward a bottom portion of the first component 102 and the second component 112. Such a clustered arrangement could be advantageous in circumstances with the first and second components are not circular or cylindrical. In various aspects, the alignment fixtures 200a-200c in FIG. 6A or the alignment fixtures 200d-200m in FIG. 6B could be interchangeable with one another. For example, for a first component and a second component having a circular cross-section and with a regularly repeating pattern of fastener holes in flanges, the alignment fixtures may be identical and therefore interchangeable. In various other aspects, the alignment fixtures 200a-200c in FIG. 6A or the alignment fixtures 200d-200m in FIG. 6B could be different. For example, the first component and the second component could have a noncircular shape and/or the pattern of the array of fastener holes in the flanges of the first component and the second component could be irregular. In such circumstances, each alignment fixture could be specific to one particular position relative to the first component and the second component.

Referring again to FIG. 1B, after the alignment fixtures 200 have engaged such that the first component 102 and the second component 112 are aligned, fasteners 140 (e.g., bolts, rivets, or the like) can be installed through the aligned fastener holes 110 and 120 in the flanges 108 and 118, respectively. In various circumstances, the fastener holes 110 and 120 may not be at a final size when the first component 102 and the second component 112 are first aligned. For example, the first component 102 and the second component 112 may be manufactured at different locations and/or by different suppliers. To ensure that the fastener holes 110 and 120 will be suitably-sized for final assembly, the fastener holes 110 and 120 may be intentionally undersized by the manufacturers. After the first component 102 and the second component 112 are aligned using the alignment fixtures 200, workers could ream out the fastener holes 110 and 120 to the final specified diameter (e.g., a diameter that provides a neat fit with the fasteners 140). The first component 102 and the second component 112 could then be separated to deburr the fastener holes 110 and 120 and to provide for other cleanup activity. The first component 102 and the second component 112 could then be realigned (using the alignment fixtures 200) and the fasteners 140 could be installed in the fastener holes 110 and 120.

After the fasteners 140 are installed in the fastener holes 110 and 120, the first alignment device 220 can be removed from the first component 102 and the second alignment device 250 can be removed from the second component 112. The first alignment device 220 is removed from the first component 102 by releasing and removing the temporary spring-loaded fasteners 274, freeing the first alignment device 220 from the first component 102. Similarly, the second alignment device 250 is removed from the second component 112 by releasing and removing the temporary spring-loaded fasteners 284, freeing the second alignment device 250 from the second component 112. As discussed above, the temporary spring-loaded fasteners 274 and 284 engaged holes 105 and 115 in the skins 104 and 114 of the first component and the second component, respectively. As also discussed above, the holes 105 and 115 could ultimately be used for fasteners 134 that attach stringer end fittings 130 to the skins 104 and 114. After the first alignment device 220 and the second alignment device 250 are removed from the first component 102 and the second component 112, respectively, the stringer end fittings 130 can be installed. In various aspects, the stringer end fittings 130 may be omitted. In such aspects, the holes 105 and 115 in the skins 104 and 114 could be patched or otherwise filled.

Figure 7A:
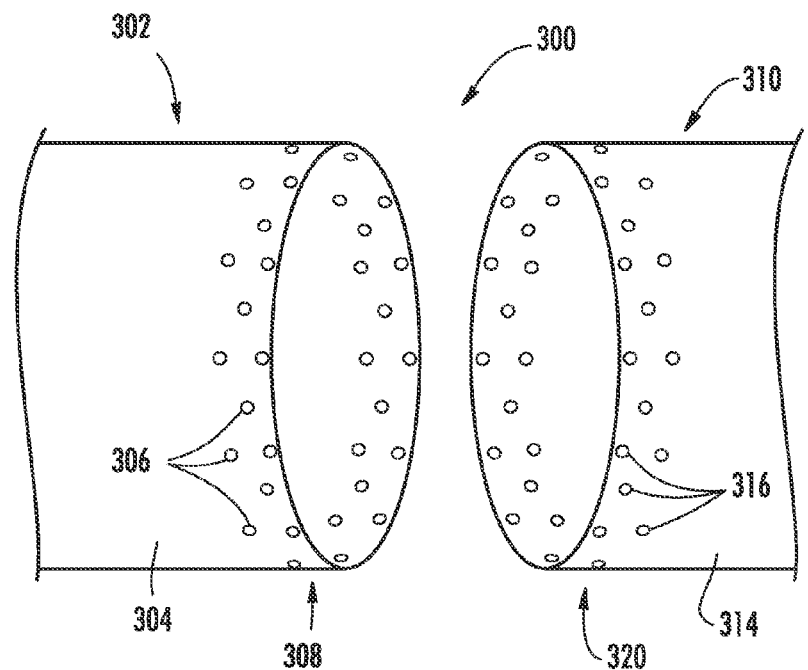
FIG. 7A is a perspective view of two fuselage sections being moved toward one another for something.
Figure 7B:
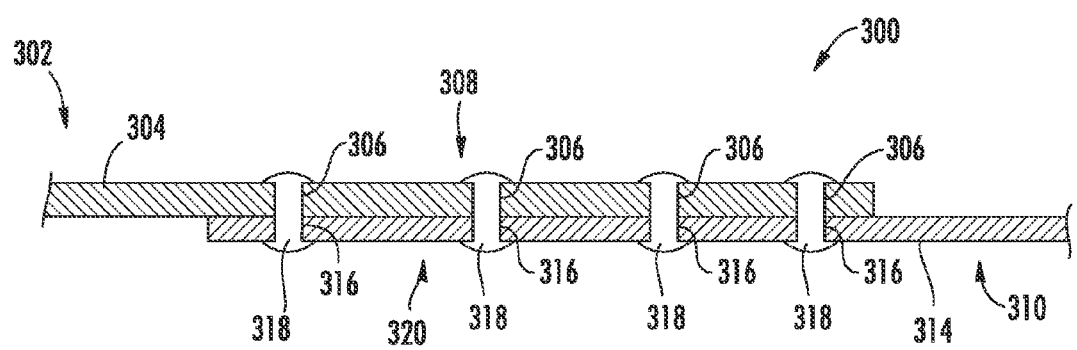
FIG. 7B is a partial cross-sectional side view of the portions of the two fuselage sections shown in FIG. 7A, wherein the fuselage sections overlap, and wherein fasteners are arranged in aligned holes of the overlapping fuselage sections.

FIGS. 7A and 7B illustrates another fuselage 300 that includes a first component 302 (e.g., a first fuselage section) and a second component 310 (e.g., a second fuselage section). The first component 302 includes a skin 304 and an array or plurality of fastener holes 306 arranged around the skin 304 at an end portion 308 of the first component 302. The second component 310 includes a skin 314 and an array or plurality of fastener holes 316 arranged around the skin 314 at an end portion 320 of the second component 310. At least the end portion 320 of the second component 310 is smaller than the first component 302 such that the end portion 320 of the second component 310 fits inside the end portion 308 of the first component 302 such that the end portions 308 and 320 overlap (as shown in FIG. 7B). Furthermore, the array of fastener holes 316 in the second component 310 are arranged in a similar manner to the array of fastener holes 306 and the first component 302 such that the arrays of fastener holes 306 and 316 can be aligned when the end portions 308 and 320 overlap. Once the arrays of fastener holes 306 and 316 are aligned, fasteners 318 (e.g., rivets, bolts, or the like) can be installed in the fastener holes 306 and 316 to secure the first component 302 and the second component 310 together. Similar to the aspect described above with reference to FIGS. 1-6, arranging the first component 302 and the second component 310 such that the arrays of fastener holes 306 and 316 are aligned can be difficult.

Figure 8A:
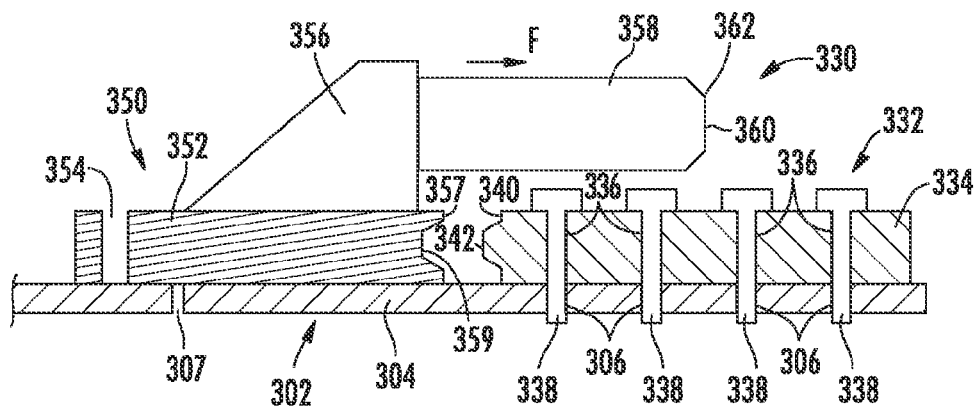
FIG. 8A is a partial cross-sectional side view of a portion of a first fuselage section shown in FIG. 7A with a first mating fixture of an alignment fixture being positioned on the first fuselage section.
Figure 8B:
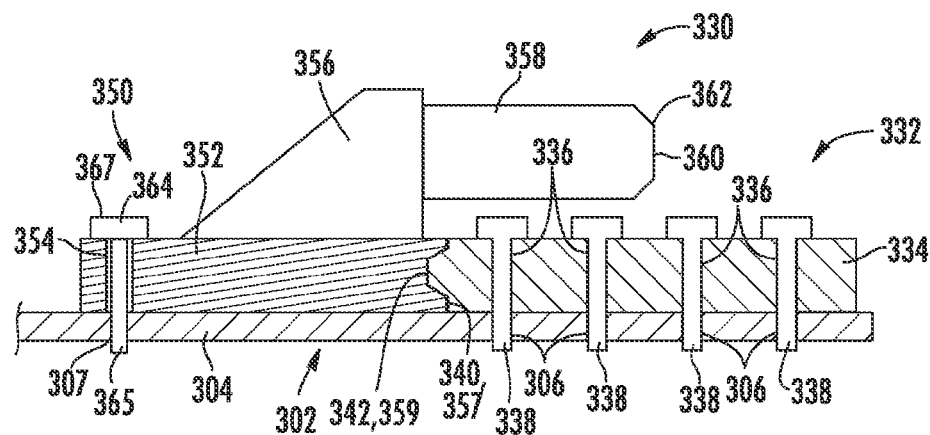
FIG. 8B is a partial cross-sectional side view of the portion of the first fuselage section shown in FIG. 8A with the first mating fixture of the alignment fixture positioned on the first fuselage section.
Figure 8C:
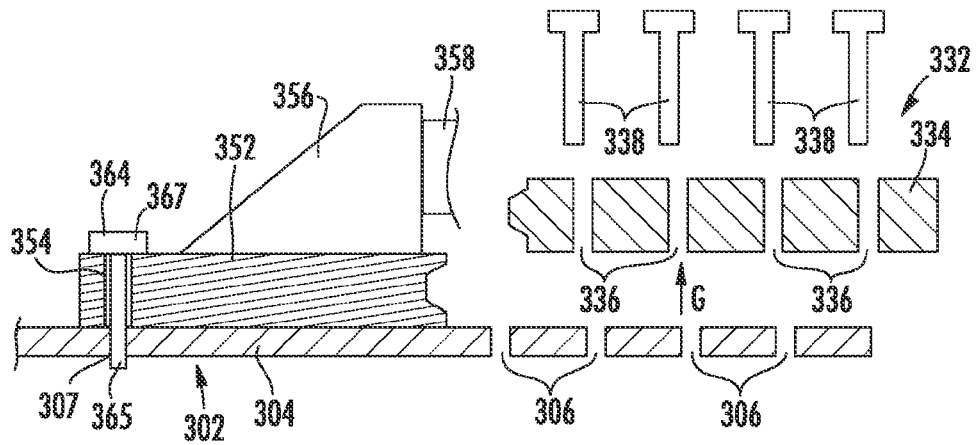
FIG. 8C is a partial cross-sectional side view of the portion of the first fuselage section shown in FIG. 8A with a first reference plate of the first mating fixture removed.

An alignment fixture, similar to the alignment fixture 200 described above, can be used to align the first component 302 and the second component 310. FIGS. 8A-8C illustrate a first mating fixture 330 of the alignment fixture that includes a first reference plate 332 and a first alignment device 350. The first reference plate 332 is attached to certain fastener holes 306 in the skin 304 of the first component 304. FIG. 8A illustrates a plurality of fastener holes 336 through a body 334 of the first reference plate 332 that are aligned with certain ones of the array of fastener holes 306 in the skin 304. Fasteners 338 are arranged through the aligned holes 336 and 306. The fastener 338 could be bolts, pins, temporary spring-loaded fasteners, or the like. In this aspect, the first alignment device 350 is not connected to and/or aligned with the first reference plate 332 when the first reference plate 332 is aligned with and attached to the skin 304 of the first component 302.

Referring to FIG. 8B, the first alignment device 350 is aligned with the first reference plate 332 by moving the first alignment device 350 in the direction of arrow F such that a facing surface 359 of the first alignment device 350 and a facing surface 342 of the first reference plate 332 abut one another. Keyed features 357 on the facing surface 359 of the first alignment device 350 can engage keyed features 340 on the facing surface 342 of the first reference plate 332. As described above, the keyed features 357 and 340 can include shapes and/or contours that only engage (fit together) in a single orientation. Thus, when the keyed features 357 and 340 are engaged, the first alignment device 350 is aligned with the first reference plate 332. Accordingly, the keyed features 340 are considered to be a first reference plate mating feature, and the keyed features 357 are considered to be a first alignment device mating feature.

Furthermore, the alignment of the first reference plate 332 relative to the holes 306 in the skin 304 of the first component 302 is transferred to the aligned first alignment device 350. Once the first alignment device 350 is aligned relative to the first reference plate 332, the first alignment device 350 can be temporarily attached to the skin 304 of the first component 302. For example, as shown in FIG. 8B, temporary spring-loaded fasteners 364 can be inserted through holes 354 in the body 352 of the first alignment device 350 to engage holes 307 in the skin 304 of the first component 302. As discussed above, a top portion 367 of the temporary spring-loaded fastener 364 can engage the body 352 of the first alignment device 350 and a bottom portion 365 of the temporary spring-loaded fastener 364 can engage the skin 304 of the first component 302, clamping the first alignment device 350 and the skin 304 together.

As discussed above, the holes 307 could be arranged in the skin 304 for a later use, such as fastening stringer end fittings. Alternatively, the holes 308 could be arranged in the skin 304 for use by the first alignment device 350 and could be filled in at a later time.

As shown in FIG. 8C, after the first alignment device 350 has been temporarily attached to the skin 304 of the first component 302, the fasteners 338 can be removed from the holes 306 and the skin 304 and from the holes 336 in the body 334 of the first reference plate 332. Thereafter, the first reference plate 332 can be removed from the skin 304, as indicated by arrow G.

Figure 9A:
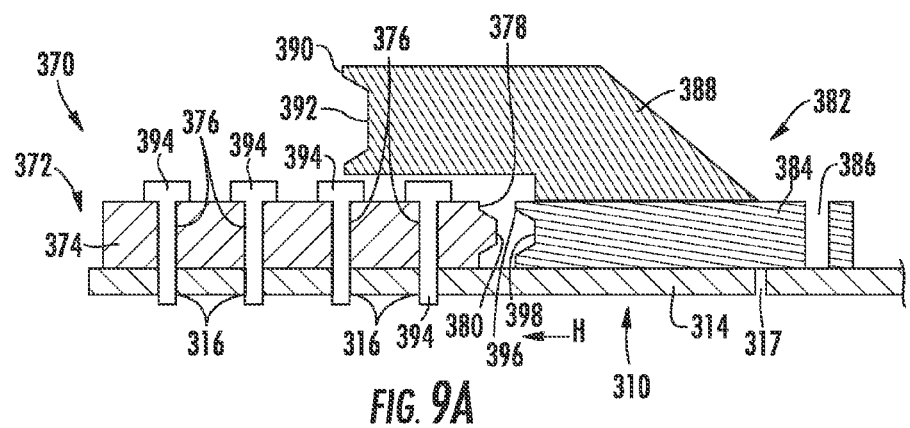
FIG. 9A is a partial cross-sectional side view of a portion of a second fuselage section shown in FIG. 7A with a second mating fixture of an alignment fixture being positioned on the second fuselage section.
Figure 9B:
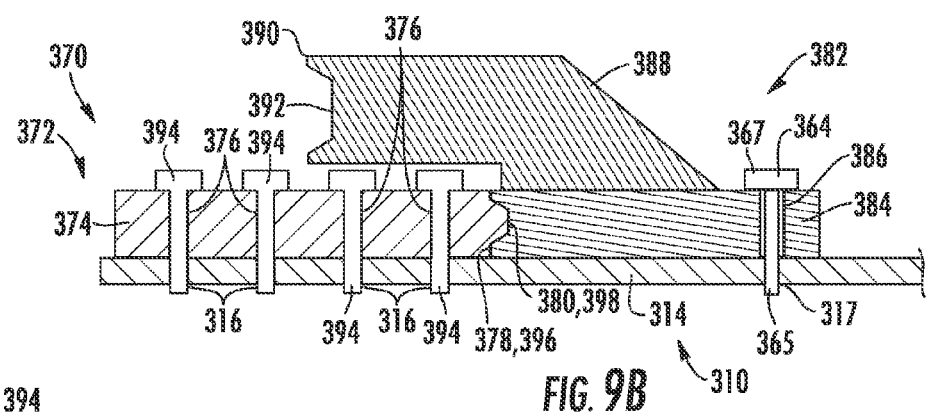
FIG. 9B is a partial cross-sectional side view of the portion of the second fuselage section shown in FIG. 9A with the second mating fixture of the alignment fixture positioned on the second fuselage section.
Figure 9C:
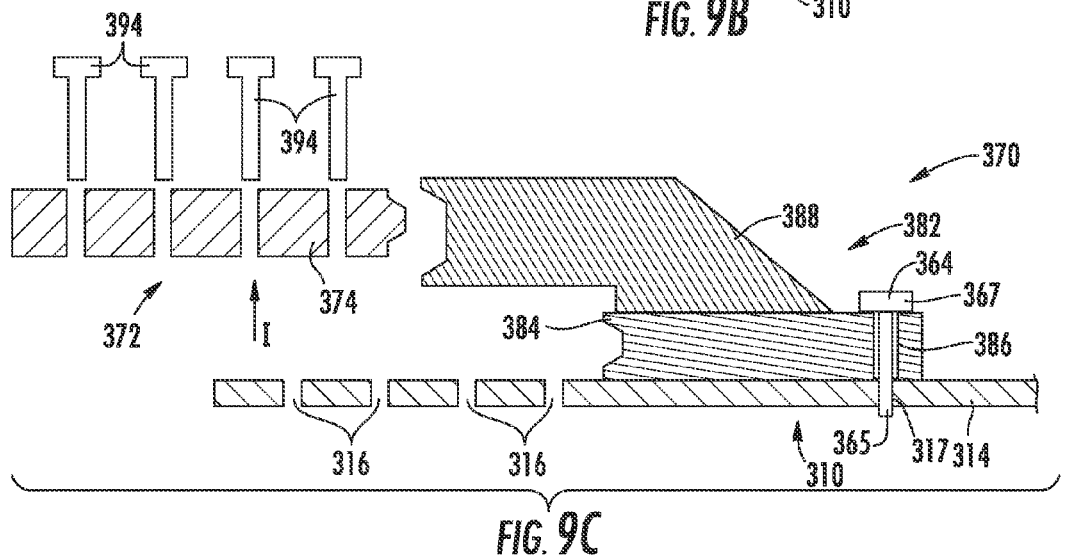
FIG. 9C is a partial cross-sectional side view of a portion of the second fuselage section shown in FIG. 9A with a second reference plate of the second mating fixture removed.

FIGS. 9A-9C illustrate a second mating fixture 370 of the alignment fixture that includes a second reference plate 372 and a second alignment device 382. The second reference plate 372 is attached to certain fastener holes 316 on the skin 314 of the first component 310. FIG. 9A illustrates a plurality of fastener holes 376 through a body 374 of the second reference plate 372 that are aligned with certain ones of the array of fastener holes 316 and the skin 314. Fasteners 394 are arranged through the aligned holes 376 and 316. The fasteners 394 could be bolts, pins, temporary spring-loaded fasteners, or the like. In this aspect, the second alignment device 382 is not connected to the second reference plate 372 when the second reference plate 372 is aligned with and attached to the skin 314 of the second component 310.

As shown in FIG. 9B, the second alignment device 382 is aligned with the second reference plate 372 by moving the second alignment device 382 in the direction of arrow H such that a facing surface 398 of the second alignment device 382 and a facing surface 380 of the second reference plate 372 abut one another. Keyed features 396 on the facing surface 398 of the second alignment device 382 can engage keyed features 378 on the facing surface 380 of the second reference plate 372. As described above, the keyed features 396 and 378 can include shapes and/or contours that only engage (fit together) in a single orientation. Thus, when the keyed features 396 and 378 are engaged, the second alignment device 382 is aligned with the second reference plate 372. Accordingly, the keyed features 378 are considered to be a second reference plate mating feature, and the keyed features 396 are considered to be a second alignment device mating feature.

Furthermore, the alignment of the second reference plate 372 relative to the holes 316 in the skin 314 of the second component 310 is transferred to the aligned second alignment device 382 such that the second alignment device 382 is aligned relative to the holes 316. Once the second alignment device 382 is aligned relative to the second reference plate 372, the second alignment device 382 can be temporarily attached to the skin 314 of the second component 310. For example, as shown in FIG. 9B, temporary spring-loaded fasteners 364 can be inserted through holes 386 in a body 384 of the second alignment device 382 engage holes 317 in the skin 314 of the second component 310. As discussed above, a top portion 367 of the temporary spring-loaded fastener 364 can engage the body 384 of the second alignment device 382 and a bottom portion 365 of the temporary spring-loaded fastener 364 can engage the skin 314 of the second component 310, clamping the second alignment device 382 and the skin 314 together.

As shown in FIG. 9C, after the second alignment device 382 has been temporarily attached to the skin 314 of the second component 310, the fasteners 394 can be removed from the holes 316 in the skin 314 and from the holes 376 in the body 374 of the second reference plate 372. Thereafter, the second reference plate 372 can be removed from the skin 314, as indicated by arrow I.

Figure 10:
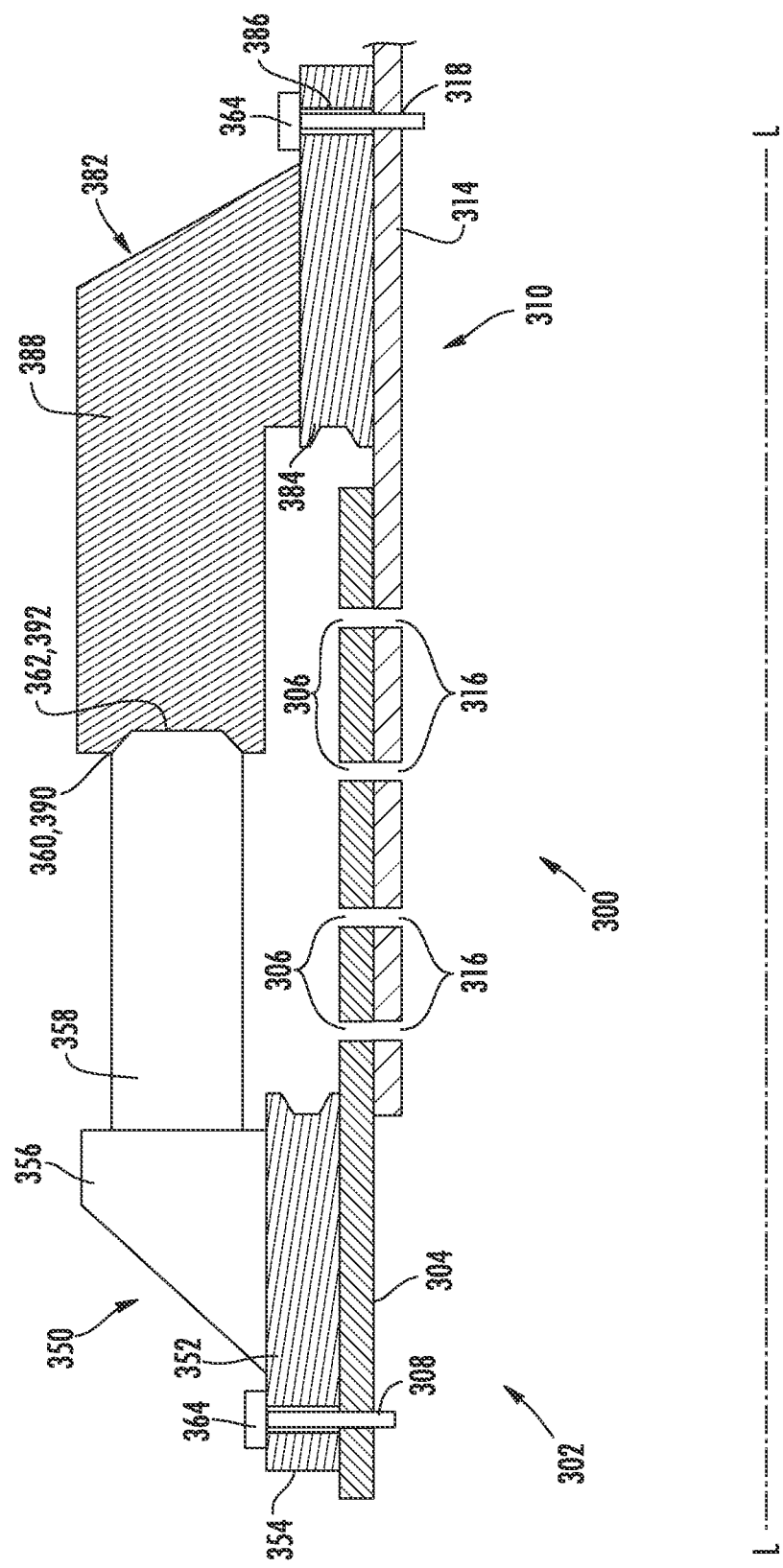
FIG. 10 is a partial cross-sectional side view of the portion of the first fuselage section and the second fuselage section with the first and second mating fixtures applied respectively, and wherein the first and second mating fixtures are engaged to align fastener holes in the fuselage sections.

Primarily referring to FIG. 10, the first alignment device 350 can include a bracket 356 attached to the body 352. A first alignment feature 358 can extend from the bracket 356 along a longitudinal axis L-L of the first component 302 and the second component 310. The first alignment feature 358 can include keyed features 362 at an end 360. The second alignment device 382 can include a second alignment feature 388 extending from the body 384. The second alignment feature 388 can include keyed features 392 at an end 390. The keyed features 392 on the second alignment feature 388 match the keyed features 362 on the first alignment feature 358. Thus, when the first component 302 and the second component 310 are brought together and the keyed features 362 and 392 are engaged, the array of holes 306 in the first component 302 will be aligned with the array of holes 316 in the second component 310. Thereafter, fasteners 318 (shown in FIG. 7B) can be inserted through the aligned arrays of fastener holes 306 and 316 to attach the first component 302 to the second component 310. After the first component 302 and the second component 310 are attached, the temporary spring-loaded fasteners 364 can be removed from the first alignment device 350 and the second alignment device 382, and the first alignment device 350 and the second alignment device 382 can be removed from the first component 302 and the second component 310.

The alignment fixtures described herein allow for fastener holes of relatively large components to be aligned without requiring a worker to closely monitor the alignment of the fastener holes. With reference to the aircraft fuselage 100 reference in FIG. 1A, a worker was positioned inside of the first component 102 (i.e., the first fuselage section) to monitor alignment of the fastener holes 110 and 120 on the flanges 108 and 118 and to provide guidance to other workers who were moving the first fuselage section and the second fuselage section (the second component 112) together. Using the alignment fixtures 200, described herein, the first fuselage section and the second fuselage section can be aligned without a worker being positioned inside the first fuselage section.

The aspects of alignment fixture as discussed above with reference to the Figures are used in the context of aircraft fuselage sections. Aspects of alignment fixtures described herein could also be used in other applications. For example, alignment fixtures described herein could be used to align fastener holes of oil pipeline sections or the like. As another example, alignment fixtures described herein could be used to align fastener holes in steel beams used in building construction. In such examples, workers who previously were positioned to monitor alignment of the fastener holes could be removed from the assembly process. In addition to reducing the number of workers required to assemble such pipeline sections, steel beams, or the like, the alignment fixtures could result in an overall safer work environment. For example, ironworkers positioned to align fastener holes in steel beams are at risk of being crushed by the moving beams. Alignment fixtures described herein can enable a crane operator or the like to maneuver a steel beam into position (with fastener holes aligned) without the aid of an on-site worker. Once the steel beam is in position and relatively stationary, an ironworker could then move into position to install fasteners in the aligned fastener holes.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to various aspects, other and further aspects may be devised without departing from the basic scope thereof, and the scope thereof is determined by the claims that follow.

What is claimed is:

1. A method for aligning a first component and a second component, wherein the first component includes a first plurality of fastener holes, wherein the second component includes a second plurality of fastener holes, and wherein the first plurality of fastener holes and the second plurality of fastener holes are alignable to receive fasteners that join the first component and the second component, the method comprising:

attaching a first reference plate to at least two of the fastener holes of the first plurality of fastener holes in the first component;

aligning mating features of a first alignment device with cooperating mating features of the first reference plate, thereby placing the at least two fastener holes and the first alignment device in a predefined relative arrangement;

having placed the at least two fastener holes and the first alignment device in the predefined relative arrangement, attaching the first alignment device to the first component;

attaching a second reference plate to at least two of the fastener holes of the second plurality of fastener holes in the second component;

aligning mating features of a second alignment device with cooperating mating features of the second reference plate, thereby placing the at least two fastener holes and the second alignment device in a predefined relative arrangement;

having placed the at least two fastener holes and the second alignment device in the predefined relative arrangement, attaching the second alignment device to the second component; and mating a first alignment feature of the first alignment device and a cooperating second alignment feature of the second alignment device to urge the first plurality of holes in the first component and the second plurality of holes in the second component into alignment.

2. The method of claim 1, further comprising removing the first reference plate from the first component and the second reference plate from the second component before mating the first alignment feature of the first alignment device and the cooperating second alignment feature of the second alignment device.

3. The method of claim 1, further comprising applying fasteners through the aligned first plurality of fastener holes and the second plurality of fastener holes.

4. The method of claim 3, further comprising removing the first alignment device from the first component and removing the second alignment device from the second component after the fasteners are applied through the first plurality of fastener holes and the second plurality of fastener holes.

5. The method of claim 1, wherein mating the first alignment feature of the first alignment device and the cooperating second alignment feature of the second alignment device comprises inserting a portion of the first alignment feature into the second alignment feature.

6. The method of claim 1, further comprising:
attaching a third reference plate to at least a first different two of the fastener holes of the first plurality of fastener holes in the first component;
aligning mating features of a third alignment device with cooperating mating features of the third reference plate, thereby placing the first different at least two fastener holes and the third alignment device in a predefined relative arrangement;
having placed the first different at least two fastener holes and the third alignment device in the predefined relative arrangement, attaching the third alignment device to the first component;
attaching a fourth reference plate to at least a second different two of the fastener holes of the second plurality of fastener holes in the second component;
aligning mating features of a fourth alignment device with cooperating mating features of the fourth reference plate, thereby placing the second different at least two fastener holes and the fourth alignment device in a predefined relative arrangement;
having placed the second different at least two fastener holes and the fourth alignment device in the predefined relative arrangement, attaching the fourth alignment device to the second component; and
mating a third alignment feature of the third alignment device and a cooperating fourth alignment feature of the fourth alignment device to urge the first plurality of holes in the first component and the second plurality of holes in the second component into alignment.

7. The method of claim 6, further comprising removing the third reference plate from the first component and the fourth reference plate from the second component before mating the third alignment feature of the third alignment device and the cooperating fourth alignment feature of the fourth alignment device.

8. The method of claim 6, further comprising:
attaching a fifth reference plate to at least a third different two of the fastener holes of the first plurality of fastener holes in the first component;
aligning mating features of a fifth alignment device with cooperating mating features of the fifth reference plate, thereby placing the third different at least two fastener holes and the fifth alignment device in a predefined relative arrangement;
having placed the third different at least two fastener holes and the fifth alignment device in the predefined relative arrangement, attaching the fifth alignment device to the first component;
attaching a sixth reference plate to at least a fourth different two of the fastener holes of the second plurality of fastener holes in the second component;
aligning mating features of a sixth alignment device with cooperating mating features of the sixth reference plate, thereby placing the fourth different at least two fastener holes and the sixth alignment device in a predefined relative arrangement;
having placed the fourth different at least two fastener holes and the sixth alignment device in the predefined relative arrangement, attaching the sixth alignment device to the second component; and
mating a fifth alignment feature of the fifth alignment device and a cooperating sixth alignment feature of the sixth alignment device to urge the first plurality of holes in the first component and the second plurality of holes in the second component into alignment.

9. The method of claim 8, further comprising removing the fifth reference plate from the first component and the sixth reference plate from the second component before mating the fifth alignment feature of the fifth alignment device and the sixth alignment feature of the sixth alignment device.

10. An alignment fixture for aligning a first component and a second component, wherein the first component includes a first plurality of fastener holes, wherein the second component includes a second plurality of fastener holes, and wherein the first plurality of fastener holes and the second plurality of fastener holes are aligned to receive fasteners that join the first component and the second component, the alignment fixture comprising:
a first mating fixture, including:
a first reference plate adapted to align with at least two of the first plurality of fastener holes in the first component and including a first reference plate mating feature;
a first alignment device comprising:
a first alignment device mating feature and a first alignment feature, the first alignment device mating feature adapted to cooperatively engage the first reference plate mating feature to align the first alignment device with the first reference plate, to thereby place the at least two of the first plurality of fastener holes and the first alignment device in a predefined relative arrangement;

wherein the first alignment device is adapted to be coupled to a surface of the first component when the first alignment device and the at least two fastener holes are in the predefined relative arrangement; and a second mating fixture, including:
  a second reference plate adapted to align with at least two of the second plurality of fastener holes in the second component and including a second reference plate mating feature; and
  a second alignment device comprising:
    a second alignment device mating feature and a second alignment feature, the second alignment device mating feature adapted to cooperatively engage the second reference plate mating feature to align the second alignment device with the second reference plate, thereby placing the at least two fastener holes and the second alignment device in a predefined relative arrangement; and
  wherein the second alignment device is adapted to be coupled to a surface of the second component when the second alignment device and the at least two fastener holes are in the predefined relative arrangement; wherein the first alignment feature is adapted to engage the second alignment feature when the first component and the second component are brought together, such that engagement of the first alignment feature and the second alignment feature urges the first component and the second component into alignment.

11. The alignment fixture of claim 10, wherein the first alignment feature comprises a bull nose extending from the first alignment device, wherein the second alignment feature comprises an aperture in the second alignment device, and wherein the bull nose engages an interior surface of the aperture.

12. The alignment fixture of claim 10, wherein the first alignment feature comprises a first keyed surface on the first alignment device, wherein the second alignment feature comprises a second keyed surface on the second alignment device, and wherein the second keyed surface matches the first keyed surface in a particular orientation.

13. The alignment fixture of claim 10, wherein the first reference plate is removable from the at least two of the first plurality of fastener holes in the first component after the first alignment device is coupled to the first component, and wherein the second reference plate is removable from the at least two of the second plurality of fastener holes in the second component after the second alignment device is coupled to the second component.

14. The alignment fixture of claim 10, wherein the first component and the second component are first and second barrel sections, respectively, of an aircraft fuselage, wherein the first plurality of fastener holes are arranged on a first flange arranged at an angle relative to a first fuselage skin, wherein the second plurality of fastener holes are arranged on a second flange arranged at an angle relative to a second fuselage skin section, and wherein the first flange and the second flange abut one another when the first component and the second component are aligned;

wherein the first reference plate abuts the first flange when aligned relative to the at least two of the first plurality of fastener holes, wherein the first alignment device abuts the first fuselage skin when aligned relative to the first reference plate, and wherein the first alignment device is configured to be coupled to the first fuselage skin; and wherein the second reference plate abuts the second flange when aligned relative to the at least two of the second plurality of fastener holes, wherein the second alignment device abuts the second fuselage skin when aligned relative to the second reference plate, and wherein the second alignment device is configured to be coupled to the second fuselage skin.

15. The alignment fixture of claim 14, wherein the first fuselage skin includes a first hole therethrough for receiving a first fastener, and wherein the first alignment device is coupled to the first fuselage skin with a first reusable rivet that is positioned in the first hole; and wherein the second fuselage skin includes a second hole therethrough for receiving a second fastener, and wherein the second alignment device is coupled to the second fuselage skin with a second reusable rivet that is positioned in the second hole.

16. The alignment fixture of claim 10, wherein the first alignment device mating feature includes a first keyed surface, wherein the first reference plate mating feature includes a second keyed surface, and wherein the first alignment device aligns with the first reference plate when the first keyed surface and the second keyed surface are engaged; and wherein the second alignment device mating feature includes a third keyed surface, wherein the second reference plate mating feature includes a fourth keyed surface, and wherein the second alignment device aligns with the second reference plate when the third keyed surface and the fourth keyed surface are engaged.

17. The alignment fixture of claim 10, wherein the first mating fixture further comprises first mating pins arrangable in the first reference plate and the at least two of the first plurality of fastener holes to align the first reference plate and the at least two of the first plurality of fastener holes; and wherein the second mating fixture further comprises second mating pins arrangable in the second reference plate and the at least two of the second plurality of fastener holes to align the second reference plate and the at least two of the second plurality of fastener holes.

18. The alignment fixture of claim 10, wherein the first component and the second component are first and second sections, respectively, of an aircraft fuselage, wherein the first plurality of fastener holes are arranged on a first fuselage skin, wherein the second plurality of fastener holes are arranged on a second fuselage skin, and wherein the first fuselage skin can overlap with the second fuselage skin such that the first and second plurality of fastener holes align;

wherein the first reference plate abuts the first fuselage skin when aligned relative to the at least two of the first plurality of fastener holes, wherein the first alignment device abuts the first fuselage skin when aligned relative to the first reference plate, and wherein the first alignment device is configured to be coupled to the first fuselage skin; and wherein the second reference plate abuts the second fuselage skin when aligned relative to the at least two of the second plurality of fastener holes, wherein the second alignment device abuts the second fuselage skin when aligned relative to the second reference plate, and wherein the second alignment device is configured to be coupled to the second fuselage skin.

19. The alignment fixture of claim 18, wherein the first reference plate and the second reference plate are configured to be removed from the first fuselage skin and the second fuselage skin, respectively, after the first alignment device and the second alignment device are coupled to the first fuselage skin and the second fuselage skin, respectively.

* * * * *

UNITED STATES PATENT AND TRADEMARK OFFICE
CERTIFICATE OF CORRECTION

PATENT NO. : 9,981,367 B2
APPLICATION NO. : 14/793403
DATED : May 29, 2018
INVENTOR(S) : Mark Edward Nestleroad et al.

It is certified that error appears in the above-identified patent and that said Letters Patent is hereby corrected as shown below:

In the Claims

In Column 20, Line 37, in Claim 17, delete "arrangable" and insert -- arrangeable --, therefor.

In Column 20, Line 42, in Claim 17, delete "arrangable" and insert -- arrangeable --, therefor.

Signed and Sealed this
Eleventh Day of December, 2018

Andrei Iancu
*Director of the United States Patent and Trademark Office*